(12) United States Patent
Jebb et al.

(10) Patent No.: US 12,082,744 B2
(45) Date of Patent: Sep. 10, 2024

(54) COFFEE GRINDER THAT AUTOMATICALLY SETS GRIND LEVEL

(71) Applicant: Clive Holdings, LLC, Portland, OR (US)

(72) Inventors: Mike Jebb, La Mesa, CA (US); Ken Mosher, Fort Collins, CO (US); Tony Pitman, Pleasant View, UT (US); Paul Lehman, Salt Lake City, UT (US); Adam Raper, Park City, UT (US); Benjamin Thomas Guiles, Portland, OR (US)

(73) Assignee: Clive Holdings, LLC, Portland, OR (US)

( * ) Notice: Subject to any disclaimer, the term of this patent is extended or adjusted under 35 U.S.C. 154(b) by 375 days.

(21) Appl. No.: 17/301,551

(22) Filed: Apr. 7, 2021

(65) Prior Publication Data

US 2021/0219782 A1    Jul. 22, 2021

Related U.S. Application Data

(63) Continuation of application No. PCT/US2019/056235, filed on Oct. 15, 2019.

(60) Provisional application No. 62/745,789, filed on Oct. 15, 2018.

(51) Int. Cl.
*A47J 42/18* (2006.01)
*A47J 42/46* (2006.01)

(52) U.S. Cl.
CPC ............... *A47J 42/18* (2013.01); *A47J 42/46* (2013.01)

(58) Field of Classification Search
CPC .................................. A47J 42/18; A47J 42/46
See application file for complete search history.

(56) References Cited

U.S. PATENT DOCUMENTS

| | | | | |
|---|---|---|---|---|
| 4,062,499 A | * | 12/1977 | Maejima | B02C 7/14 241/259 |
| 2,852,203 A | | 9/1985 | Adolf et al. | |
| 5,645,230 A | * | 7/1997 | Marogna | A47J 42/06 241/27 |
| 7,984,868 B2 | | 7/2011 | Anson | |
| 9,532,682 B1 | | 1/2017 | Lassota et al. | |
| 2007/0187534 A1 | * | 8/2007 | Anson | A47J 42/46 241/92 |
| 2014/0361107 A1 | * | 12/2014 | Steiner | A47J 31/42 241/253 |
| 2016/0220067 A1 | | 8/2016 | Teahan | |

(Continued)

FOREIGN PATENT DOCUMENTS

| | | | |
|---|---|---|---|
| DE | 3903018 A1 | * | 8/1990 |
| JP | 07000840 A | | 1/1995 |

OTHER PUBLICATIONS

English translate (DE3903018A1), retrieved date Mar. 28, 2023.*

(Continued)

*Primary Examiner* — Mohammed S. Alawadi
(74) *Attorney, Agent, or Firm* — Woodard, Emhardt, Henry, Reeves & Wagner, LLP

(57) ABSTRACT

A coffee grinder configured to allow a user to easily determine and adjust the grind produced. The coffee grinder includes a sensor operably connected to an adjustment shaft which allows for precise detection and manipulation of the position of the grinding elements.

34 Claims, 9 Drawing Sheets

(56) References Cited

U.S. PATENT DOCUMENTS

2019/0254468 A1\* 8/2019 Vaaranmaa ............... A23F 5/04

OTHER PUBLICATIONS

EP, EPO App. No. 19873956 Extended European Search Report, 8 pages, Jul. 22, 2022.
PCT, Intl. App. No. PCT/US2019/056235 Written Opinion of the International Searching Authority, 10 pages, Jan. 31, 2020.
PCT, Intl. App. No. PCT/US2019/056235 International Search Report, 3 pages, Jan. 31, 2020.

\* cited by examiner

COFFEE GRINDER THAT AUTOMATICALLY SETS GRIND LEVEL

CROSS REFERENCE TO RELATED APPLICATIONS

This application is a continuation of International Patent Application Number PCT/US2019/056235, filed Oct. 15, 2019, which is hereby incorporated by reference. International Patent Application Number PCT/US2019/056235, filed Oct. 15, 2019, claims the benefit of U.S. Patent Application No. 62/745,789, filed Oct. 15, 2018, which are hereby incorporated by reference.

BACKGROUND

The quality of coffee drinks depends greatly on the correct grinding and preparation of the coffee beans. Grinding the roasted coffee beans is the basic requirement for preparing coffee drinks. Improper grinding and/or brewing can lead to poorly tasting coffee.

Thus, there is a need for improvement in this field.

SUMMARY

A number of factors have been discovered, such as related to the coffee beans, growing conditions, storage conditions, roasting process, grinding process, brewing process, and/or environmental conditions during these processes (e.g., temperature, humidity, air pressure, time, etc.) as well as other factors, to dramatically impact the quality of the resulting coffee drink or beverage. In every roasted coffee bean, there are approximately 1,000 different aromas and flavors. Through the milling of the grinding process, the cell structure in the coffee bean is broken up. Flavor, color, and aromatic substances are released and can be dissolved more easily and quickly upon contact with water. Depending on the grind—coarse or very fine—the surface of the coffee changes, and many different flavors become soluble. Volatile aromas are immediately released, and these aromas combine with oxygen (or other gases) and provide the intense coffee smell during grinding. It has been discovered that achieving the correct grind characteristics greatly enhances the flavor of the resulting brewed coffee beverage. The overall coffee experience can be enhanced based on the fragrance of the ground coffee beans and the aroma of the ground coffee when infused with hot water during brewing along with the acidity, body, flavor, sweetness, balance, and aftertaste of the resulting coffee beverage.

A unique grinder system has been developed to take into account one or more factors so as to optimize the grind size to facilitate brewing of a good tasting cup of coffee or other beverage. For example, to make a delicious cup of espresso, approximately 20 grams of espresso beans need to be ground to the proper coarseness or grind size (i.e., espresso grind) so that the ground beans are exposed to the hot water during the brewing process for the proper amount of time (e.g., about 28 seconds). If the ground beans are too coarse, the water will flow too quickly through the grounds such that the flavors, aromatics, etc. are under extracted from the grounds. Under extracted coffee typically has a sour, acidic, and/or salty taste which is undesirable. On the other hand, when the beans are ground too finely, the water flows too slowly through the ground beans so as to lead to over extraction. Over extraction during brewing can undesirably lead to coffee having a bitter and/or hollow taste.

Different types of grinders provide different grind size or coarseness distributions. Typically, but not always, burr type grinders have a more uniform grind as compared to blade type grinders. Burr grinders usually grind the beans at lower temperatures as compared to blade grinders. Brewing methods and the type of desired coffee also impacts target coffee grind sizes and brewing times. Just to name a few examples, there are espresso, AEROPRESS®, pour over, CHEMEX®, cold brew, and French press grind sizes. The type of bean can also impact the desired grind size as well as the type of roast (e.g., light roast, dark roast, etc.). Temperature, humidity, and other factors can further impact the desired grind size.

The unique grinder system and technique described herein accounts for these and other factors so as to set the proper grind size. In one example, depending on these factors, the user is provided with a grind code, and the user manually enters the grind code to set up the grinder. For instance, the bag of coffee beans may include a single code or a table/chart of multiple codes, such as in the form of letters and/or numbers, based on the desired coffee beverage (e.g., espresso). The user turns a knob on the grinder to the designated code and grinds the coffee. In other examples, the grinder can automatically set the grind conditions through non-evident or non-human readable codes, such as bar codes, RFID tags, and/or Quick Response (QR) codes, as well as by sensing other variables like the temperature and humidity with sensors inside or around the grinder. The grinder system in one example communicates over a network to retrieve the grinding parameters, such as grind size, grind time, grind speed, grind temperature, and the like, from a database based on the code, and grinds the coffee according to these parameters. In other examples, a combination manual and automatic approach is used. It should be recognized that this system and technique can be adapted for use in other beverages, like tea, and in other areas such as for spices.

This unique coffee grinder system can be easily operated to provide an optimal grind profile. In accordance with some forms, the present disclosure provides a coffee grinder control system having an adjustable bean grinder including grinding elements movable to a plurality of positions to alter the grind size and grind profile of coffee ground by the adjustable bean grinder, and a sensor which detects the position of the grinding elements to allow a user to accurately position the grinding elements. In certain embodiments, the coffee grinder control system is configured to position the grinding elements at a plurality of preset positions. The coffee grinder control system may include a sensor gear driven by manipulation of the grinding elements. In accordance with certain inventive embodiments, the grinding elements include burrs. In some forms the coffee grinder control system includes a position indicator in communication with the sensor, wherein the position indicator displays the position of the grinding elements.

The coffee grinder control system further includes a motor configured to adjust the position of the grinding elements. In some forms, the motor is a stepper motor. In certain embodiments the motor is configured to provide tactile feedback.

The coffee grinder control system includes a control unit operably connected to the sensor and the adjustable bean grinder, the control unit is configured to receive input from a user and adjust position of the grinding elements. In some forms, the control unit includes a touch screen.

In accordance with certain embodiments the control unit is configured to optimize the position of the grinding elements for various types of coffee based on one or more of the following characteristics of the coffee: type, agtron score, brand, origin, botanical variety, roast profile, age, moisture content, water activity, processing method, and/or weight. In some forms, the control unit is configured to optimize the position of the grinding elements based on one or more of the following factors: age of the grinding elements, type of grinding elements, burr style, and/or burr age. In some forms, the control unit is configured to optimize the position of the grinding elements based on one or more of the following environmental factors: ambient temperature, altitude, humidity, water quality, water dissolved solids, water hardness, and/or water alkalinity. In certain forms, the grinding elements are positioned to produce a coffee grind for use in a selected coffee brewer. For example, in some forms the control unit is configured to optimize the position of the grinding elements based on one or more of the following characteristics of the selected coffee brewer: type, boiler temperature, brew water temperature, pressure(s), flow rate, and/or control parameter status. In some forms the control unit is configured to optimize the position of the grinding elements based on one or more of the following characteristics of the desired liquid coffee brew: volume, weight, brew time, dissolved solids, coffee extraction percentage, and quality.

The systems and techniques as described and illustrated herein concern a number of unique and inventive aspects. Some, but by no means all, of these unique aspects are summarized below.

Aspect 1 generally concerns a system that includes a grinder having an adjustment mechanism configured to adjust a burr gap between one or more grinding elements.

Aspect 2 generally concerns the system of any previous aspect in which the grinding elements include a first grinding element and a second grinding element that define the burr gap.

Aspect 3 generally concerns the system of any previous aspect in which the first grinding element is fixed and the second grinding element is movable relative to the first grinding element.

Aspect 4 generally concerns the system of any previous aspect in which the first grinding element includes a first burr and the second grinding element includes a second burr.

Aspect 5 generally concerns the system of any previous aspect in which the grinder includes a grinder motor connected to the second burr to rotate the second burr.

Aspect 6 generally concerns the system of any previous aspect in which the adjustment mechanism includes a linkage configured to move the grinder motor to adjust the burr gap.

Aspect 7 generally concerns the system of any previous aspect in which the linkage includes a lever arm configured to move the grinder motor and an adjustment rod assembly coupled to the lever arm.

Aspect 8 generally concerns the system of any previous aspect in which the adjustment rod assembly is coupled to the lever arm to move the lever arm by extending and retracting.

Aspect 9 generally concerns the system of any previous aspect in which the adjustment rod assembly includes a first adjustment rod and a second adjustment rod threadedly engaged to the first adjustment rod.

Aspect 10 generally concerns the system of any previous aspect in which the adjustment mechanism includes a knob coupled to the adjustment rod assembly to adjust the burr gap.

Aspect 11 generally concerns the system of any previous aspect in which the adjustment mechanism includes an adjustment motor coupled to the adjustment rod assembly to automatically adjust the burr gap.

Aspect 12 generally concerns the system of any previous aspect in which the adjustment mechanism includes a sensor configured to sense the burr gap.

Aspect 13 generally concerns the system of any previous aspect in which the sensor includes a sensor gear coupled to the adjustment rod assembly.

Aspect 14 generally concerns the system of any previous aspect in which the sensor includes a magnet coupled to the lever arm and a sensor board positioned to sense movement of the magnet.

Aspect 15 generally concerns the system of any previous aspect in which the grinder includes a controller configured to determine a burr gap setting to set the burr gap.

Aspect 16 generally concerns the system of any previous aspect in which the controller is configured to determine the burr gap setting (G) based on one or more parameters (P) and coefficients (W).

Aspect 17 generally concerns the system of any previous aspect in which the controller is configured to determine the burr gap setting (G) based on the following equation:

$$G = \sum_{i=1}^{n} W_i \times P_i$$

where:
G=Grinder Burr Gap Setting;
P=Parameter;
W=Coefficient for Parameter;
i=Parameter Number; and
n=Number of Parameters.

Aspect 18 generally concerns the system of any previous aspect in which the controller is configured to determine the burr gap setting (G) based on the following equation:

$$G = P_{Offset} + W_{Bias} + (W_{58Basket} \times P_{58Basket}) + (W_{Capp} \times P_{Capp}) + (W_{Latte} \times P_{Latte}) + (W_{DoR} \times P_{DoR}) + (W_{Dose} \times P_{Dose}) + (W_{Temp} \times P_{Temp})$$

where:
$P_{Offset}$=User defined offset;
$W_{Bias}$=Grind burr setting gap if all parameters were zero (0);
$P_{58Basket}$=Boolean that is equal to 1 when a 58 mm basket is used and 0 when the 58 mm basket is not used
$W_{58Basket}$=Offset in the grind burr setting when a 58 mm basket is used, rather than a default 53 mm basket;
$P_{Capp}$=Boolean that is equal to 1 when a cappuccino shot is desired and 0 when a cappuccino shot is not used;
$W_{Capp}$=Offset in the grind burr setting when a cappuccino shot is used, rather than a default straight shot;
$P_{Latte}$=Boolean that is equal to 1 when a latte shot is desired and 0 when a latte shot is not used;
$W_{Latte}$=Offset in the grind burr setting when a latte shot is used, rather than the default straight shot;
$P_{DoR}$=Age of coffee from roasting in days;
$W_{DoR}$=Offset in the grind setting for every additional day from a roast date;
$P_{Dose}$=Mass or weight of a dry coffee shot in grams;
$W_{Dose}$=Change in grind setting for every additional gram of dry coffee dose;

$P_{Temp}$=Temperature of the coffee shot in degrees Celsius; and $W_{Temp}$=Change in grind setting for every additional degree in temperature change.

Aspect 19 generally concerns the system of any previous aspect in which the one or more parameters (P) include basket size.

Aspect 20 generally concerns the system of any previous aspect in which the one or more parameters (P) include coffee shot type.

Aspect 21 generally concerns the system of any previous aspect in which the one or more parameters (P) include age of coffee from roasting.

Aspect 22 generally concerns the system of any previous aspect in which the one or more parameters (P) include dry coffee shot dose mass.

Aspect 23 generally concerns the system of any previous aspect in which the one or more parameters (P) include coffee temperature.

Aspect 24 generally concerns the system of any previous aspect in which the grinder includes an input device operatively connected to the controller to receive at least one of the one or more parameters (P) from the user.

Aspect 25 generally concerns the system of any previous aspect in which the server is operatively connected to the controller over a network to provide at least one of the coefficients (W).

Aspect 26 generally concerns the system of any previous aspect in which the server is configured to determine the coefficients (W) based on experimental data.

Aspect 27 generally concerns the system of any previous aspect in which the server is configured to determine the coefficients (W) using a statistical modeling technique.

Aspect 28 generally concerns the system of any previous aspect in which the statistical modelling technique includes a Multiple Linear Regression (MLR) technique.

Aspect 29 generally concerns the system of any previous aspect in which the grinder includes an output device operatively connected to the controller to provide the burr gap setting (G) to the user.

Aspect 30 generally concerns the system of any previous aspect in which the output device is incorporated in an Input/Output (I/O) device.

Aspect 31 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
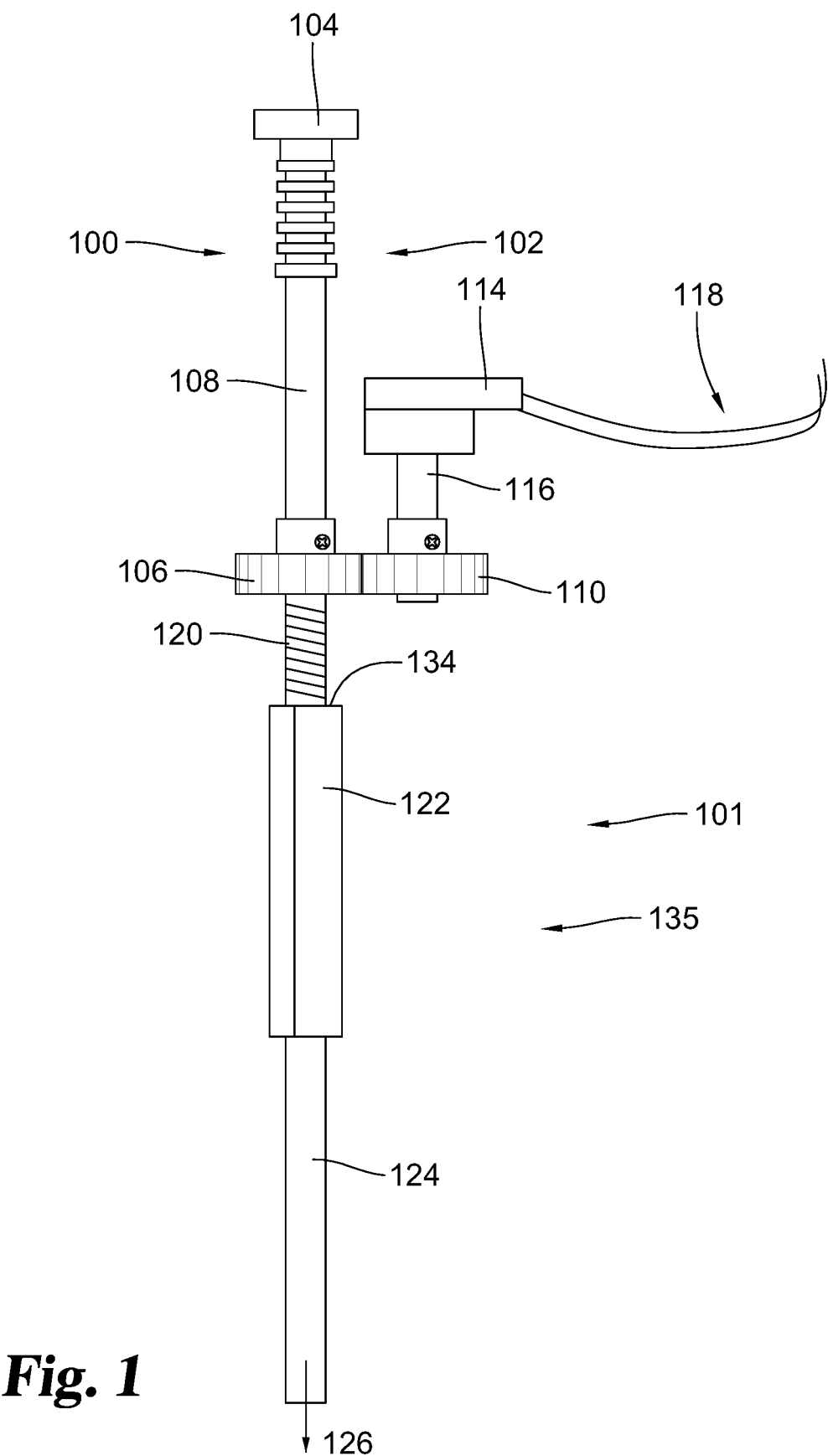
FIG. 1 is a front view of a manual coffee grinder control system of the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 illustrates one example of a coffee grinder control system 100 having an adjustment mechanism 101. The adjustment mechanism 101 in the illustrated example includes an upper adjustment rod 102. An adjustment knob 104, which is used to manually control the adjustment mechanism 101, is attached to one end of the upper adjustment rod 102. In the illustrated example, the upper adjustment rod 102 has a drive gear 106 and a spindle 108. A sensor gear 110 threadedly engages the drive gear 106 so as to rotate in unison with the drive gear 106. A sensor 114 is operatively connected to the drive gear 106 via a sensor spindle 116 that is connected to the sensor gear 110. In one example, the sensor 114 is in the form of a mechanical dial that displays a grind code, such as a numeric, alphabetical, and/or iconic code, to the user. As mentioned before, this code is indicative of the desired grinding parameters, such as a desired grind size, grind speed, grind temperature, etc., for the coffee beans to be ground. In another example, the sensor 114 includes an electronic sensor, such as an electronic and/or optical encoder, that is configured to sense the rotation of the adjustment knob 104. In one variation, the sensor 114 is configured to interpret rotation of the upper adjustment rod 102 to determine the position of one or more grinding elements within the attached coffee grinder. The sensor 114 can be configured differently and/or positioned elsewhere in the system 100. For instance, the sensor 114 can include a linear sensor, such as an optical sensor or proximity sensor, positioned along the adjustment mechanism 102 to sense the relative length of the adjustment mechanism 102. The sensor 114 in the illustrated example is operatively connected to one or more sensor lines 118 that are operatively connected to a display, controller, and/or computer, as will be explained in the further examples shown in the subsequent drawings. In one form, the sensor lines 118 are electrical or fiber optic wires connected to a display that shows the corresponding grind code based on the rotation of the knob 104. In another form, the sensor lines 118 are in the form of a wireless connection that transmits data regarding the position of the upper adjustment rod 102.

In the illustrated embodiment, the upper adjustment rod 102 includes a threaded portion 120. The adjustment mechanism 101 in the illustrated example further includes a coupler 122 with a threaded opening 134 that is threadedly coupled to the threaded portion 120 and a lower adjustment rod 124 coupled to the coupler 122. Together, the upper adjustment rod 102, the coupler 122, and the lower adjustment rod 124 form an adjustment rod assembly 135. As shown, the threaded portion 120 of the upper adjustment rod 102 threadedly engages internal threading inside the coupler 122. The lower adjustment rod 124 is rotationally fixed such that rotation of upper adjustment rod 102 via the knob 104 causes linear movement of lower adjustment rod 124 along a first longitudinal axis 126. In other words, the user is able to extend or retract the lower adjustment rod 124 by turning the knob 104. As will be described below with reference to FIGS. 2 and 3, the lower adjustment rod 124 is operably connected to one or more grinding elements of the coffee grinder such that extension and retraction of the adjustment mechanism 101 causes movement of the grinding elements so as to alter the grind size and/or grind profile of the resulting coffee grind. It is envisioned that other types of adjustment mechanisms 101 can be used in other examples. For instance, the adjustment mechanism 101 can include one or more hydraulic, pneumatic, and/or electrical type actuators. The adjustment mechanism 101 can be manually adjusted by the user through other types of interfaces besides the knob 104. Alternatively or additionally, a lever, switch, and/or button can be used to actuate the adjustment mechanism 101. In one particular example, the adjustment mechanism 101 includes an electrical linear actuator that is actuated by depressing a button.

During use, the user in one example views a grind code (e.g., the number "38") printed on the packaging of the coffee beans to be ground. To set the code in the system 100, the user then rotates the knob 104 either in a clockwise or counterclockwise direction. This in turn causes the upper adjustment rod 102 to rotate which in turn rotates the drive gear 106 and the sensor gear 110. The sensor 114 detects the rotation of the knob 104 via the rotation of the sensor gear, and the corresponding grind code is displayed on the sensor 114 and/or on a separate display operatively coupled to the sensor lines 118. The user continues to rotate the knob 104 until the sensor 114 and/or display shows the corresponding grind code found on the coffee bean packaging (e.g., "38"). As the upper adjustment rod 102 rotates, the lower adjustment rod 124 extends or retracts along the longitudinal axis 126. This longitudinal movement of the lower adjustment rod 124 changes the gap or spacing between the grinder elements which in turn adjusts the grind size or coarseness of the ground coffee beans. Once the corresponding grind code is set, the user can then grind the coffee beans using the system. Through the grind code entered through the knob 104 and sensor 114, other grind parameters, such as grind speed, grind temperature, and time, can alternatively or additionally be controlled to facilitate optimal coffee grinding.

Figure 2:
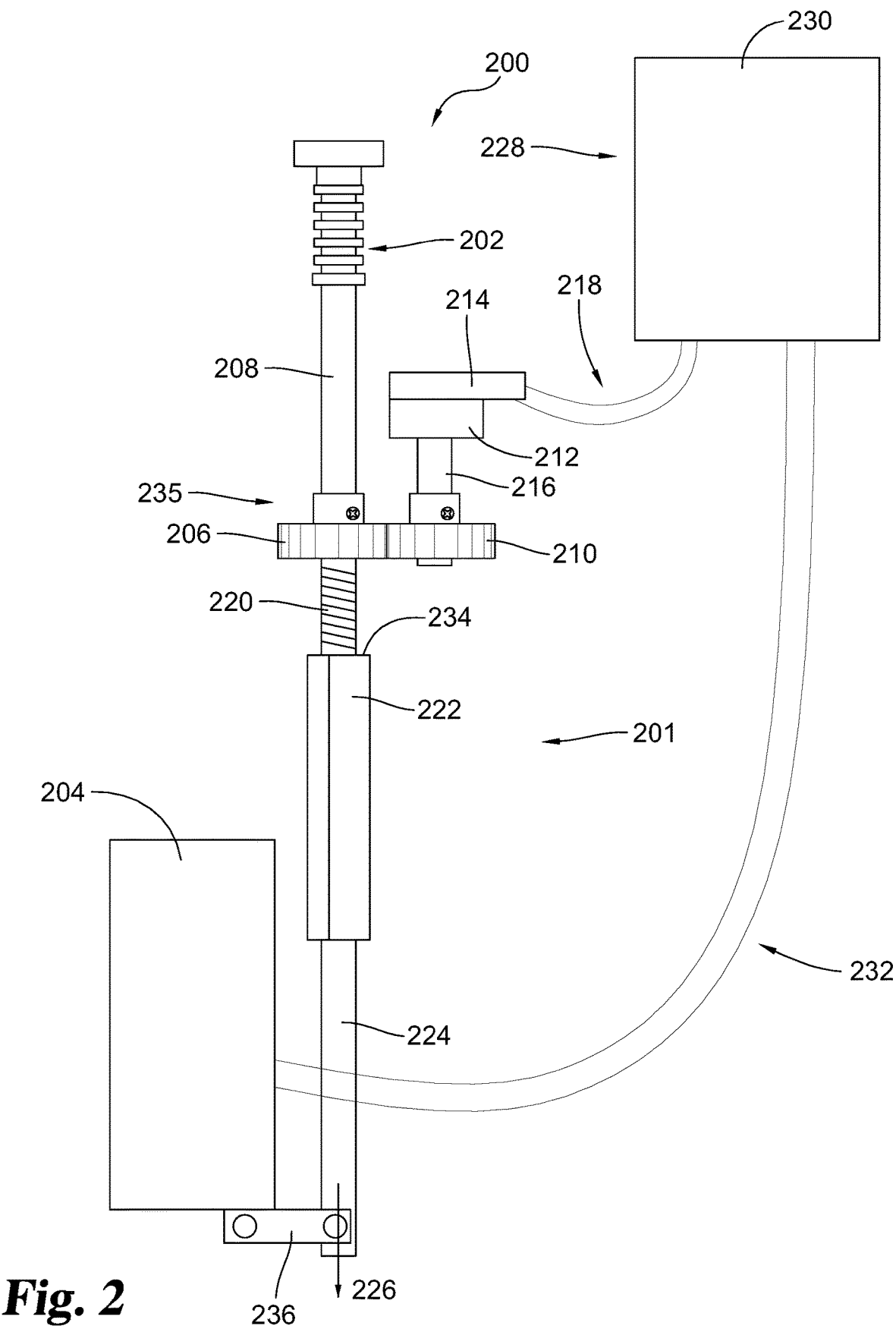
FIG. 2 is a front view of an automatic coffee grinder control system of the present disclosure.

FIG. 2 illustrates an example of a coffee grinder control system 200 that automatically or semiautomatically controls the grinding process of the coffee beans based on one or more parameters. The system in FIG. 2 has an adjustment mechanism 201 that changes the grid size or coarseness of the coffee ground by the system 200. The adjustment mechanism 201 includes an upper adjustment rod 202 that is operatively coupled to a coffee grinder 204. Like before, rotation of the upper adjustment rod 202 causes adjustment of one or more grinding elements of the attached coffee grinder 204, thereby among other things altering the size and/or profile of the resulting coffee grind. The upper adjustment rod 202 has a drive gear 206 that is secured to and rotates with a spindle 208. The drive gear 206 threadedly engages a sensor gear 210, and a motor 212 is operably connected to the sensor gear 210 through a sensor spindle 216. The motor 212 is configured to rotate the upper adjustment rod 208 through the sensor gear 210 and the drive gear 206. In one example, the motor 212 includes a stepper motor. To control the extension and retraction of the adjustment mechanism 201, the system 200 has a sensor 214 that senses the rotation of the upper adjustment rod 208 through the sensor gear 210. The sensor 214 in one variation is configured to interpret rotation of the upper adjustment rod 202 to determine the position of the one or more grinding elements within the attached coffee grinder 204. In one form, the sensor 214 can include an output device, such as a speaker and/or display, for providing information like the grind code and/or operational status. The sensor 214 can be configured differently and/or positioned elsewhere in the system 100. For instance, the sensor 214 can include a linear sensor, such as an optical sensor or proximity sensor, positioned along the adjustment mechanism 202 to sense the relative length of the adjustment mechanism 202. The sensor 214 in the illustrated example is operatively connected to one or more sensor lines 218 that are operatively connected to a display, controller, and/or computer, as will be explained below. In one form, the sensor lines 218 are electrical or fiber optic wires connected to a display that shows the corresponding grind code or other operational parameters. In another form, the sensor lines 218 are in the form of a wireless connection that transmits data.

In the illustrated embodiment, the upper adjustment rod 202 includes a threaded portion 220. The adjustment mechanism 201 in the illustrated example further includes a coupler 222 threadedly coupled to the threaded portion 220 and a lower adjustment rod 224 coupled to the coupler 222. As shown, the threaded portion 220 of the upper adjustment rod 202 threadedly engages internal threading inside the coupler 222. The lower adjustment rod 224 is rotationally fixed such that rotation of upper adjustment rod 202 via the motor 212 causes linear movement of the lower adjustment rod 224 along a first longitudinal axis 226. In other words, the system 200 is able to extend or retract the lower adjustment rod 224 through the motor 212.

As further illustrated in FIG. 2, the coffee grinder control system 200 includes a control unit 228 operatively connected to the sensor 214 through the sensor lines 218. In one form, the control unit 228 is in the form of an electronic controller, and in another form, the control unit 228 includes a computer. In certain embodiments, the control unit 228 includes one or more input/output (I/O) devices 230, such as a touch screen, speaker, microphone, and/or display, to name just a few examples. Through the sensor lines 218 the control unit 228 is able to control the movement of the adjustment mechanism 201 via the motor 212, and the control unit 228 is able to monitor the relative length and/or position of the adjustment mechanism 201 via the sensor 214. The control unit 228 is further operatively connected to the coffee grinder 204 through one or more grinder communication or control lines 232. The grinder communication lines 232 in one form include electrical wires, but the grinder communication lines 232 can include fiber optic cables, wireless communication links, and other data communication systems. The control unit 228 via the grinder control lines 232 controls and senses the operation of the coffee grinder 204. For instance, the control unit 228 in one variation is able to control and sense the operational speed of the grinding elements in the coffee grinder 204. The control unit 228 in other examples is configured to sense other parameters inside and/or outside of the coffee grinder such as environmental conditions like temperature, air pressure, and humidity.

The lower adjustment rod 224 is operably connected to one or more grinding elements of the coffee grinder 204 such that extension and retraction of the adjustment mechanism 201 causes movement of the grinding elements so as to alter the grind size and/or grind profile of the resulting coffee grind. It is envisioned that other types of adjustment mechanisms 201 can be used in other examples. For instance, the adjustment mechanism 201 can include one or more hydraulic, pneumatic, and/or electrical type actuators. In one particular example, the adjustment mechanism 201 includes an electrical linear actuator that is actuated by the control unit 228.

In the illustrated example, the adjustment rod 202 includes a threaded portion 220 which engages a threaded opening 234 in a coupler 222 such that rotation of upper adjustment rod 202 causes linear movement of the lower adjustment rod 224 along a longitudinal axis 226. Together, the upper adjustment rod 202, the coupler 222, and the lower adjustment rod 224 form an adjustment rod assembly 235. As shown, a linkage 236 is connected between the lower adjustment rod 224 and the grinder 204. As will be explained below with reference to FIG. 3, the adjustment mechanism 201 is operably connected to one or more grinding elements of the coffee grinder 204 via the linkage 236 such that movement of the adjustment mechanism 201 causes movement of one or more of the grinding elements in the grinder.

Other than being controlled via the control unit 228 and the motor 212, the adjustment mechanism 201 in FIG. 2 generally operates in a fashion similar to the adjustment mechanism 101 described with reference to FIG. 1. The coupler 222 and the lower adjustment rod 224 are rotationally fixed relative to the upper adjustment rod 202. During operation, the user can manually enter a grind code appropriate for the coffee beans, coffee type, conditions, and/or other parameters into the control unit via the I/O device 228. For instance, the user can review the appropriate grind code on the packaging of the coffee beans (or via a website), and the user can type in the corresponding numeric, alphanumeric, or other code (e.g., "38") into the control unit 228. In another variation, the control unit 228 automatically retrieves the grind code by scanning a bar code, QR code, and/or a code from an RFID tag on or associated with the coffee bean packaging. To set the grind size appropriate for the entered grind code, the control unit 228 sends a signal to the motor 212 via the sensor lines 218 so as to activate the motor 212. Via the gears 206, 210, the motor 212 rotates the upper adjustment rod 202. As noted before, the upper adjustment rod 202 is rotatable about the longitudinal axis 226, and the lower adjustment rod 224 is rotationally fixed. When the motor 212 rotates the upper adjustment rod 202, the threaded engagement between the threaded portion 220 of the upper adjustment rod 202 and the coupler 222 causes the lower adjustment rod 224 to move (i.e., extend or retract) along the longitudinal axis 226. This resulting extension or retraction of the adjustment mechanism 201 causes the relative position of the grind or grinding elements in the grinder 204 to move via the linkage 236. At the same time, the sensor 214 monitors the relative location of the grinding elements by tracking the rotation of the sensor gear 210 and communicates this position data to the control unit 228 via the sensor lines 218. Once the proper spacing of the grinding elements is achieved indicative of the desired grind size, the control unit 228 stops or otherwise deactivates the motor 212. Via the I/O device 230, the control unit 228 can then for example indicate that the grinder is set up properly and is ready to grind the coffee beans. During grinding, the control unit 228 via the control lines 232 controls the operation of the grinder 204 to the parameters appropriate for the grind code. For instance, the control unit 228 can control grind speed, grind time, and temperature during grinding.

Figure 3:
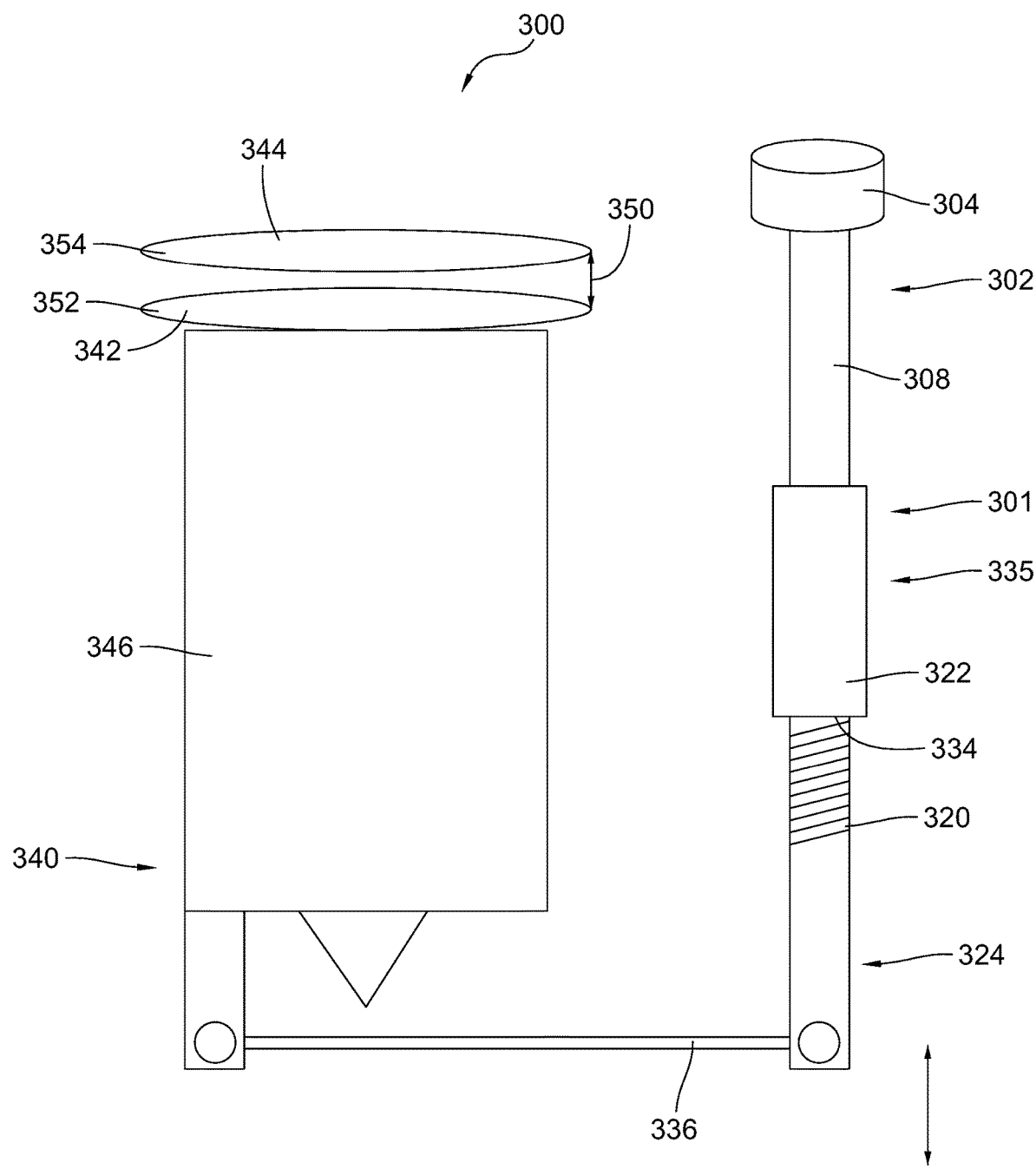
FIG. 3 is a side view of one embodiment of a grinder system of the present disclosure.

An example of grinder system 300 and operational technique showing how the FIG. 1 system 100 and the FIG. 2 system adjust grind size will now be described with reference to FIG. 3. While this technique for setting grind size will be described with reference to a burr type grinder, this technique can be adapted for use with other types of grinders like blade type grinders. Like in the FIG. 1 and FIG. 2 examples, the grinder system 100 has an adjustment mechanism 301 with an upper adjustment rod 302 having a spindle 308 that is axially rotated. For the sake of brevity as well as clarity, these common components and functions will not be described again in great detail, but please refer to the earlier discussion of those features. Rotation of the upper adjustment rod 302 can be achieved either by manual rotation of a knob 304 (like in FIG. 1), or by automatic rotation by a motor (like in FIG. 2). In the illustrated embodiment, a coupler 322 is fixed to the upper adjustment rod 302. The coupler 322 threadedly couples the upper control rod 302 to a threaded portion 320 of a lower control rod 324. The coupler 322 includes a threaded opening 334 to which the threaded portion 320 of the lower control rod 324 is threadedly engaged. Together, the upper adjustment rod 302, the coupler 322, and the lower adjustment rod 324 form an adjustment rod assembly 335. The lower adjustment rod 324 is coupled to a lever or linkage 336. In the illustrated embodiment, rotation of the upper adjustment rod 302 causes the threaded portion 320 of the lower adjustment rod 324, which is rotationally fixed, to move in a longitudinal direction. As the upper adjustment rod 302 rotates, the threaded connection between the coupler 322 and the threaded portion 320 causes the lower adjustment rod 324 to move towards or extend away from the upper adjustment rod 302. The adjustment mechanism 301 is configured such that movement of the lower adjustment rod 324 causes lever or linkage 336 to pivot. This pivoting motion of the lever 336 causes the motor 346 to move in a longitudinal or linear direction.

The grinder 340 includes a lower grinding element 342 rotatably attached to a motor 346. The grinder 340 further has an upper grinding element 344 that is generally fixed and positioned proximal to the lower grinding element 342. In other examples, the upper grinding element 344 is able to rotate. The upper grinding element 344 has a first grinding surface 354 opposing a second grinding surface 352 on the lower grinding element 342. In use, motor 346 causes rotational movement of lower grinding element 342 trapping and crushing a substrate (e.g., coffee beans) between the lower grinding element 342 and the upper grinding element 344. Movement of the motor 346 and the lower grinding element toward the upper grinding element 344 reduces a burr gap or distance 350 between the first grinding surface 354 and the second grinding surface 352. A relatively small distance 350 between the first grinding surface 354 and the second grinding surface 352 results in finer coffee grinds, and a relatively large distance 350 between the first grinding surface 354 and the second grinding surface 352 results in larger and coarser coffee grinds. As noted before, the adjustment mechanism 301 is configured such that movement of the lower adjustment rod 324 causes lever or linkage 336 to pivot. This pivoting motion of the lever 336 causes the motor 346 to move in a longitudinal or linear direction. The lower grinding element 342, which is attached to the motor 346, in turn moves in this longitudinal direction, thereby adjusting the distance 350 between the first grinding surface 354 and the second grinding surface 352. Again, reducing the distance 350 between the first grinding surface 354 and the second grinding surface 352 results in finer coffee grounds, and increasing the distance 350 between the first grinding surface 354 and the second grinding surface 352 results in larger or coarser coffee grounds.

Figure 4:
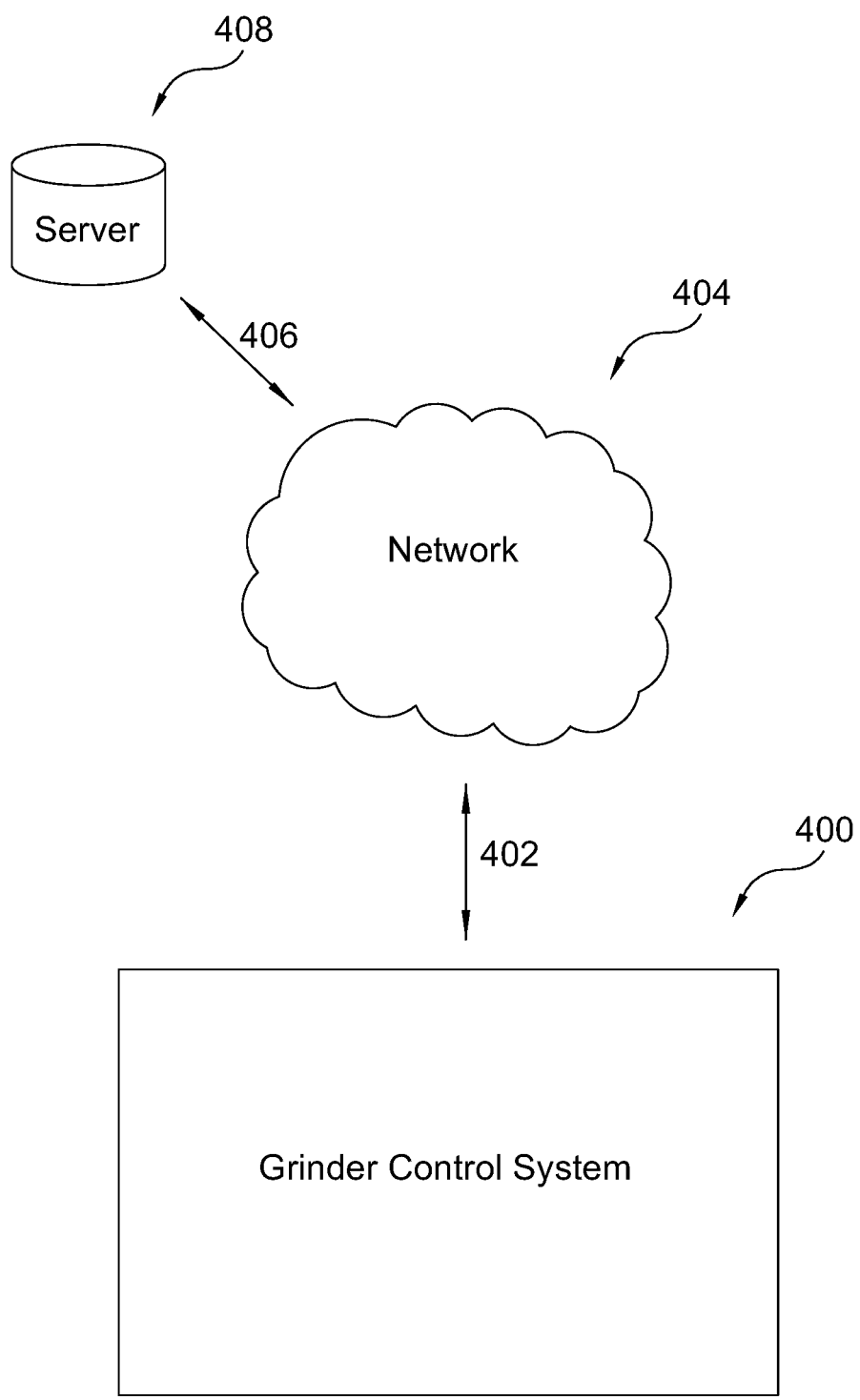
FIG. 4 is a diagrammatic view of one embodiment of a coffee grinder control system of the present disclosure.

A coffee grinder control system 400, such as for use in conjunction with the automatic system 200 of FIG. 2, will now be described with reference to FIG. 4. This system 400 is configured to automatically update and refresh the operational parameters and other grind code related information. As shown, a grinder network connection 402 operatively connects the control system 400 with a communication network, such as the Internet. A server network connection 406 operatively connects a server 408, which includes a database that stores the operational parameters associated with the kind codes, to the network 404. Through the network 404, the control system 400 is able to communicate with the server 408. In this way the coffee grinder control system 400 can transmit and receive information to and from the network 404 and/or server 408. For example, a user may enter in one or more variables into the coffee grinder control system 400 (see, FIG. 2). Variables may be entered by, for example, using the control unit. In some forms the coffee grinder control system is configured to scan a product packaging, for example by scanning a label, a bar code, or a Quick Response (QR) code. The coffee grinder control system 400 then communicates over the network 404 with the server 408 to receive instructions for optimizing the grind settings for the specific coffee. In some forms, the coffee grinder control system 400 retrieves information from the network 404 and/or server 408 to optimize the position of the grinding elements 352, 354 for various types of coffee based on one or more of the following characteristics of the coffee: type, agtron score, brand, origin, botanical variety, roast profile, age, moisture content, water activity, processing method, and/or weight. In some forms, the coffee grinder control system retrieves information from the network 404 and/or server 408 to optimize the position of the grinding elements based on one or more of the following factors: age of the grinding elements, type of grinding elements, burr style, and/or burr age. In some forms, the coffee grinder control system retrieves information from the network 404 and/or server 408 to optimize the position of the grinding elements based on one or more of the following environmental factors: ambient temperature, altitude, humidity, water quality, water dissolved solids, water hardness, and/or water alkalinity. In certain forms, the grinding elements are positioned to produce a coffee grind for use in a selected coffee brewer. For example in some forms, the coffee grinder control system retrieves information from the network 404 and/or server 408 to optimize the position of the grinding elements based on one or more of the following characteristics of the selected coffee brewer: type, boiler temperature, brew water temperature, pressure(s), flow rate, and/or control parameter status. In some forms, the coffee grinder control system retrieves information from the network 404 and/or server 408 to optimize the position of the grinding elements based on one or more of the following characteristics of the desired liquid coffee brew: volume, weight, brew time, dissolved solids, coffee extraction percentage, and quality.

Figure 5:
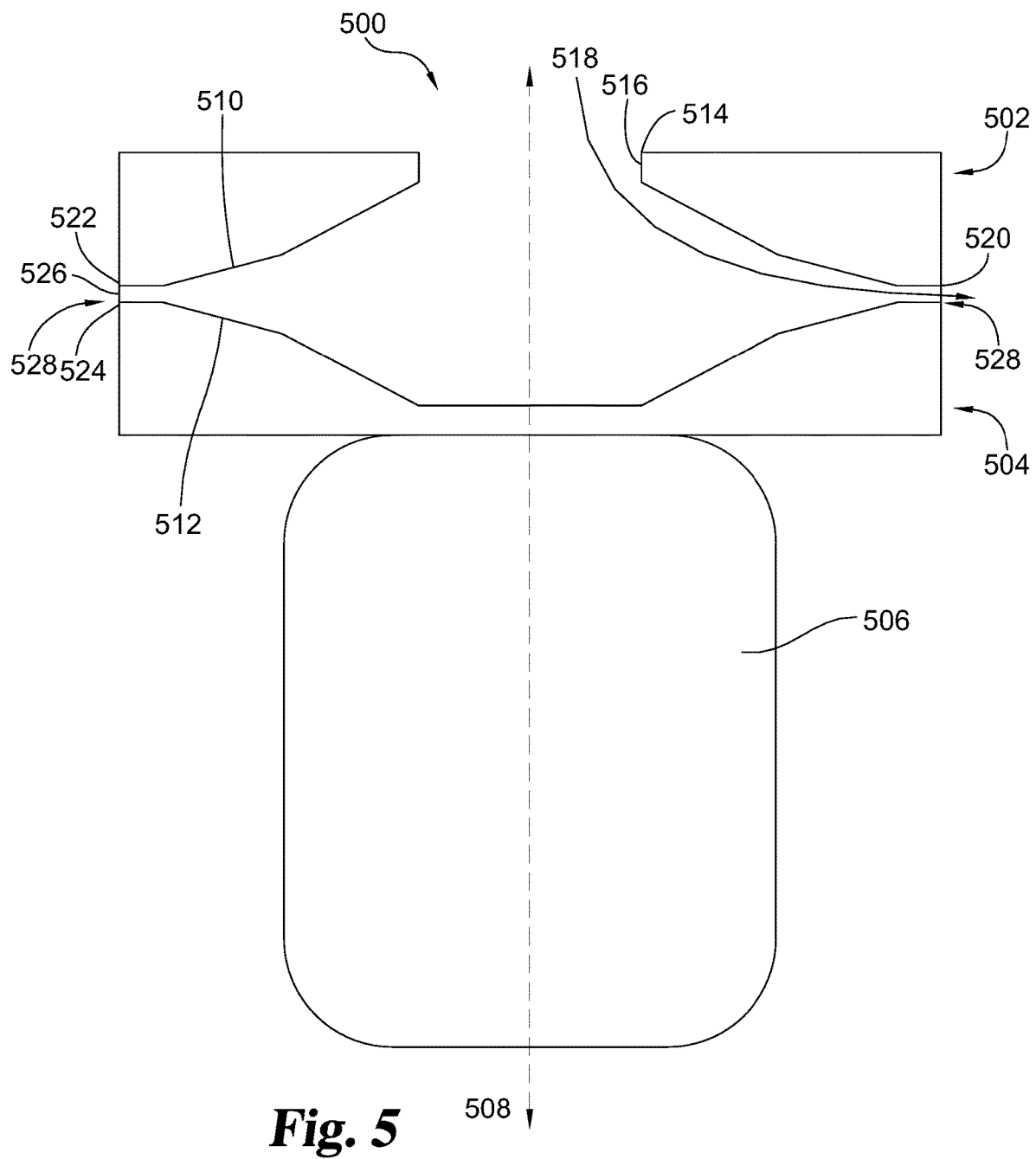
FIG. 5 is a partial cross-sectional view of a coffee grinder.

FIG. 5 illustrates one embodiment of a coffee grinder 500 for use with the coffee grinder control systems described previously with respect to FIGS. 2, 3, and 4. The coffee grinder 500 includes an upper grinding element 502 and a lower grinding element 504. Lower grinding element 504 is driven by a motor 506 to rotate around a central axis 508. Upper grinding element 502 has a first grinding surface 510. Lower grinding element 504 has a second grinding surface 512 opposing the first grinding surface 510. First opening 514 is defined by inner edge 516 of the upper grinding element 502. A second opening 520 is defined by an upper grinding element lateral edge 522 and a lower grinding element lateral edge 524. The coffee grinder is configured such that the space between the first grinding surface and the second grinding surface decreases towards the lateral edges of the grinding elements. The closest point 526 between the first grinding surface and the second grinding surface forms a distance or burr gap 528 that determines how fine or coarse the resulting grind will be. In use the coffee follows grinding path 518, through the first opening 514, and out the second opening 520. As discussed herein, the present disclosure provides a mechanism for adjusting the position of the lower grinding element 504 relative to the upper grinding element 502.

Figure 6:
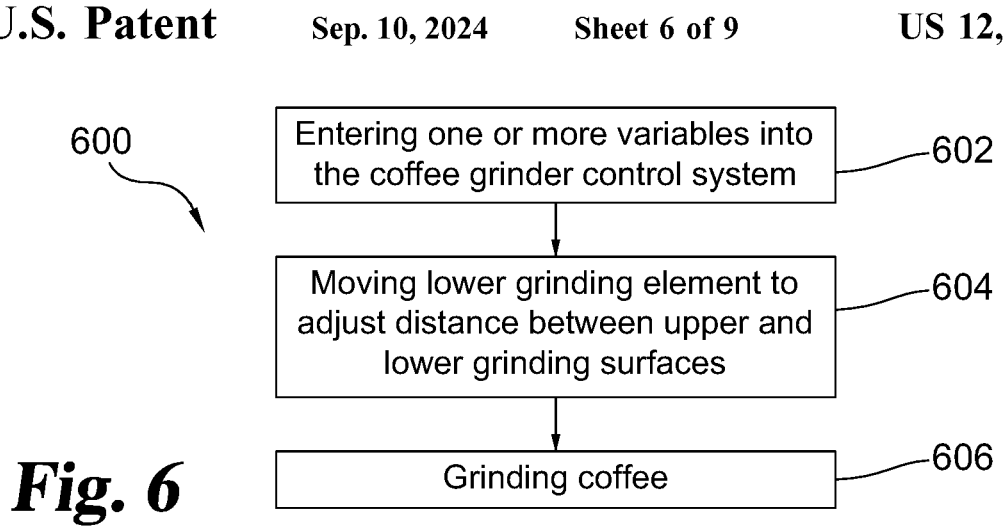
FIG. 6 is a flowchart of a technique for grinding coffee.

FIG. 6 is a flowchart 600 illustrating a technique for adjusting a coffee grinder. As noted before, a number of factors are considered when setting the process properties, parameters, and variables for grinding coffee. Table 1, which is provided below, identifies just a few of these properties, parameters, and/or variables.

TABLE 1

| | |
|---|---|
| Coffee type | Coffee agtron (color) score |
| Coffee brand | Coffee origin |
| Coffee botanical variety | Coffee roast profile |
| Coffee age | Coffee moisture content |
| Coffee water activity | Coffee processing method |
| Coffee grind size | Coffee grind profile |
| Coffee weight | Ambient temperature |
| Altitude | Relative and absolute humidity |
| Grinder type | Grinder burr style |
| Grinder burr age | Grinder control parameter status |
| Coffee machine type | Coffee machine boiler temperature |
| Coffee machine brew water temperature | Coffee machine pressure(s) |
| Coffee machine flow rate | Coffee machine control parameter status |
| Water quality | Water dissolved solids |
| Water hardness | Water alkalinity |
| Liquid coffee volume | Liquid coffee weight |
| Liquid coffee brew time | Liquid coffee dissolved solids |
| Liquid coffee extraction percentage | Liquid coffee quality |
| Human preference | Human skill |
| Human habit | Presence or absence of accessories |

The technique in FIG. 6 will now be described with reference to the systems shown in to FIGS. 2, 3, 4, and 5. In stage 602, a user enters one or more variables as outlined above into the coffee grinder control system via the I/O device 230. In another example, the user simply enters a grinder code that incorporates one or more of these variables. Such entering may be performed using the control unit 228, for example in embodiments utilizing automatic adjustments or by using a reference guide to determine the correct manual adjustment parameters. In stage 604, the lower grinding element 342, 504 is moved to adjust the distance 350 between the upper 354 and lower 352 grinding surfaces. In embodiments utilizing manual adjustments, the user may rotate the knob 104, 304 or other implement. In other embodiments the control unit 228 and sensor 212 cause movement of the lower grinding element 342, 504 as discussed above. In stage 606, coffee is passed between the upper and lower grinding elements and ground to produce the desired coffee grind.

Figure 7:
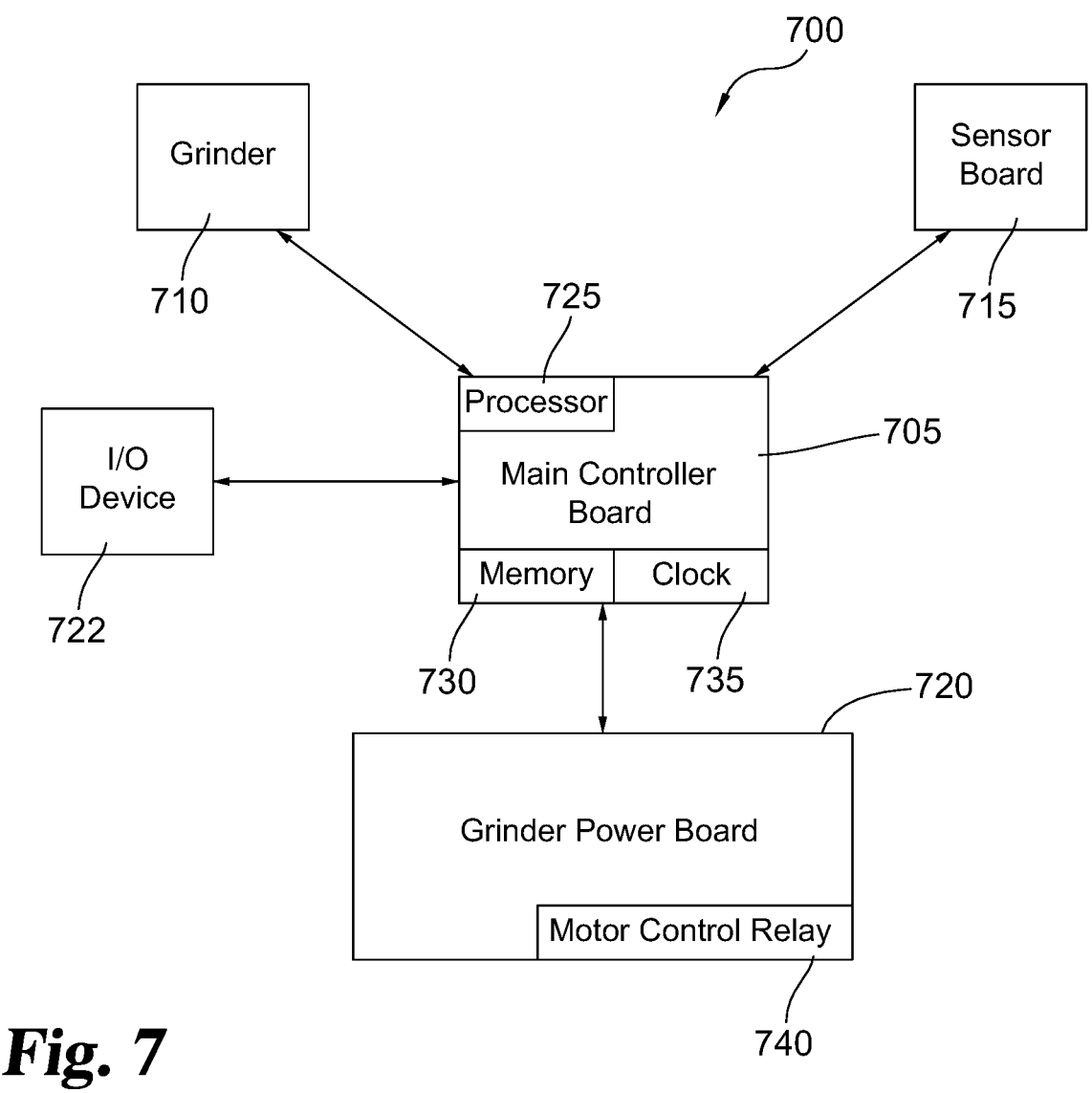
FIG. 7 is a diagrammatic view of a coffee grinder control system according to another example.
Figure 8:
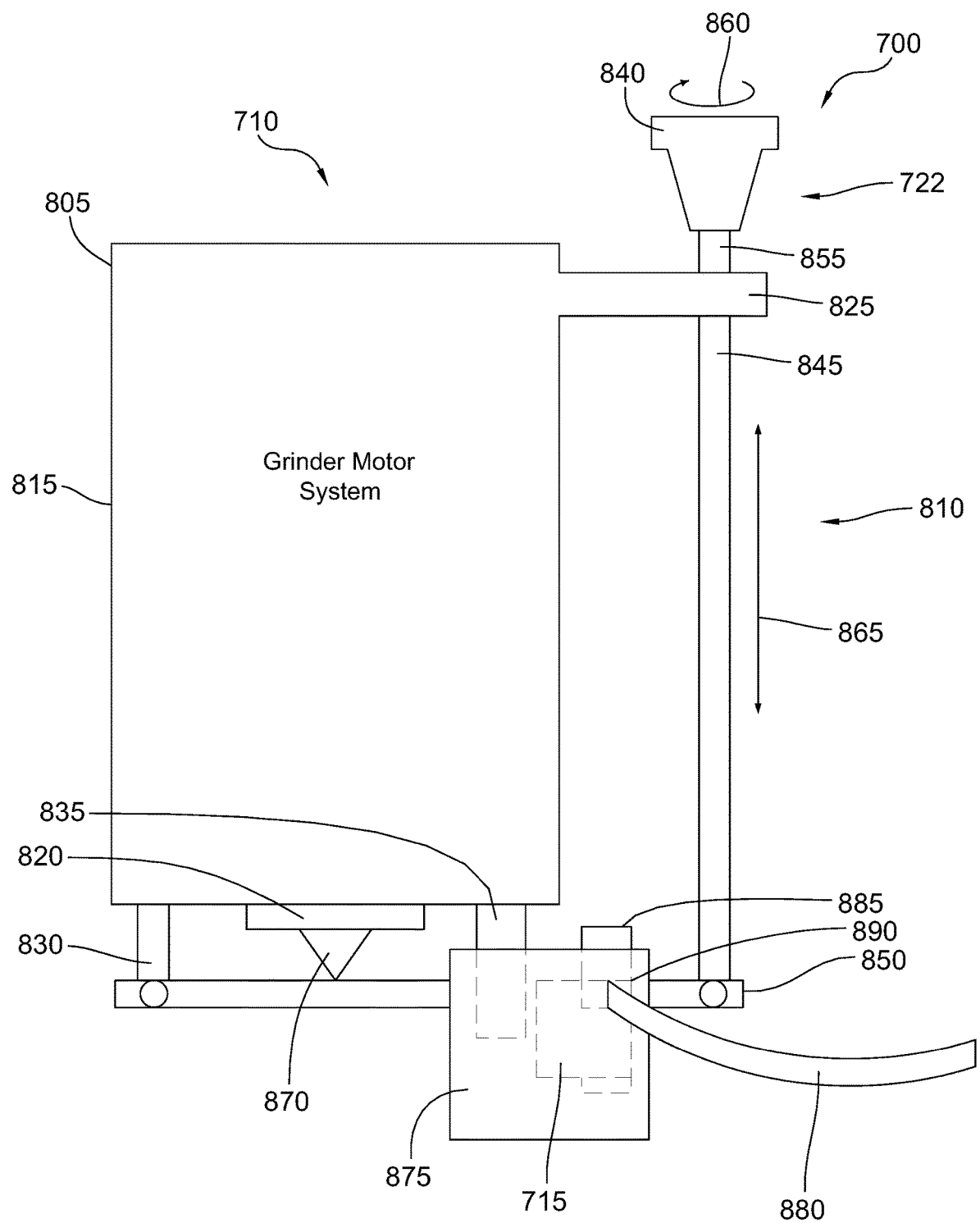
FIG. 8 is a side view of the FIG. 7 coffee grinder control system.

FIGS. 7 and 8 illustrate another example of a coffee grinder control system 700. It should be recognized that the coffee grinder control system 700 in FIG. 7 can be used with the previously discussed coffee grinder systems. Like before, the coffee grinder control system 700 uses a bottom-up burr control mechanism so as to control grind size. As shown, the coffee grinder control system 700 includes a main controller board or controller 705, a coffee grinder 710, a sensor board 715, a grinder power board 720, and an input/output device ("I/O device") 722. The coffee grinder 710, sensor board 715, grinder power board 720, and I/O device 722 are each operatively connected to the controller 705 such as through wires or wirelessly. It should be recognized that these components can be operatively connected together in other ways. The controller 705 along with the other components are connected to a power source, like an electrical outlet, to receive power.

By receiving information from a number of sources, like the sensor board 715, grinder power board 720, and I/O device 722, the controller 705 is able to control the grind size of the coffee ground by the coffee grinder 710. Among other things, the controller 705 includes a processor 725, memory 730, and a clock 735. It should be recognized that the controller 705 can include other components. The memory 730 and clock 735 are operatively connected to the processor 725. The processor 725 in one variation receives inputs from at least the coffee grinder 710, sensor board 715, grinder power board 720, and I/O device 722 so as to provide output signals for controlling the grind size.

The sensor board 715 is designed to sense the relative position of a grinder motor lever or linkage that positions the motor of the coffee grinder 710. Through the sensor board 715, the processor 725 of the controller 705 is able to infer the distance or burr gap 528 between the upper grinding element 502 and lower grinding element 504 (see e.g., FIGS. 3 and 5). In one form, the sensor board 715 includes a proximity sensor. In one particular form, the sensor board 715 includes a magnetic type sensor.

The I/O device 722 can include a wide variety of devices such as knobs, buttons, displays, indicator lights, microphones, and/or speakers. In one form, the I/O device 722 includes a knob and dial of the type described before in the earlier examples. In another form, the I/O device 722 includes a touchscreen. Information from the server 408 and processor 725, such as the coffee bean and other information discussed previously, can be stored in memory 730. Among other things, the processor 725 via the clock 735 can control the grind time of the coffee grinder 710 through the grinder power board 720. The grinder power board 720 provides power to the motor of the coffee grinder 710. In the illustrated example, the grinder power board 720 has a motor control relay 740 that controls power supplied to the motor.

Referring to FIG. 8, the coffee grinder 710 of the coffee grinder control system 700 includes a motor system 805 to provide power for grinding the coffee and an adjustment mechanism 810 configured to adjust the grind size for the ground coffee. The motor system 805 includes a grinder housing 815 and a motor 820 slidably received in the grinder housing 815 in a telescoping manner. In one example, the motor 820 is an electric motor that rotates the lower grinding element 504 to grind the coffee. The grinder housing 815 has an adjustment bracket 825 to which the 810 is engaged, a fulcrum bracket 830 to which the adjustment mechanism 810 is pivotally attached, and a guide protrusion 835.

In the illustrated example, the adjustment mechanism 810 includes a knob 840, an adjustment rod 845, and a lever arm 850. At one end, the adjustment rod 845 has threading 855 to which the knob 840 is threadedly secured, and at the opposite end, the adjustment rod 845 is pivotally coupled to the lever arm 850. The adjustment rod 845 extends through the adjustment bracket 825 in a sliding manner. As indicated by arrow 860 in FIG. 8, the knob 840 is able to rotate relative to the adjustment rod 845. The knob 840 engages the adjustment bracket 825 of the grinder housing 815 so as to adjust the effective length of the adjustment rod 845. In other words, by rotating the knob 840, the adjustment rod 845 is able to extend and retract relative to a longitudinal axis 865 of the coffee grinder 710. One end of the lever arm 850 is coupled to the adjustment rod 845, and the opposite end of the lever arm 850 is pivotally coupled to the fulcrum bracket 830 of the grinder housing 815. Between the ends, the coffee grinder 710 has a motor support 870 that contacts the lever arm 850 to support and move the motor 820. To provide fine grind control, the lever arm 850 is in the form of a class 2 lever with the adjustment rod 845, fulcrum bracket 830, and motor support 870, but the adjustment mechanism 810 in other examples can include other types of levers (e.g., class 1 or 3) or other types of mechanisms. For instance, the adjustment mechanism 810 in other variations can include a screw type drive for adjusting the relative position of the motor 820 in the coffee grinder 710.

The sensor board 715 measures the movement or location of the lever arm 850 relative to the grinder housing 815. As depicted in FIG. 8, the sensor board 715 is housed in a sensor housing 875. The sensor housing 875 is connected to the grinder housing 815 in a fixed manner via the guide protrusion 835 so that the sensor housing 875 along with the sensor board 715 remain generally stationary relative to the grinder housing 815. In one form, the guide protrusion 835 includes a fastener, such as a screw, that is secured to the sensor housing 875 via a nut. It should be recognized that the sensor housing 875 can be secured to the grinder housing 815 in other manners. The lever arm 850 extends through the sensor housing 875. The guide protrusion 835 along with the sensor housing 875 help to guide the lever arm 850 during pivoting.

The coffee grinder control system 700 further has a sensor harness 880 that operatively connects the sensor board 715 to the controller 705. In one form, the sensor harness 880 includes electrical wires, and in another form, the sensor harness 880 includes fiber optic cables. In the illustrated example, the sensor board 715 detects the relative position and/or motion of the lever arm 850 via magnetic sensing techniques. As shown, a magnet holder 885 that holds a magnet 890 is slidably disposed in the sensor housing 875. The magnet holder 885 is attached to the lever arm 850 such that as the magnet holder 885 along with the magnet 890 move with the lever arm 850. In one form, the magnet 890 is a permanent magnet, and more specifically, a rare earth magnet. The sensor board 715 in one variation senses changes in the strength and/or polarity of the magnetic field from the magnet 890 to sense the relative position and/or movement of the lever arm 850. With this information, the controller 705 is able to determine the burr gap or distance 350 between the lower grinding element 342 and upper grinding element 344.

Figure 9:
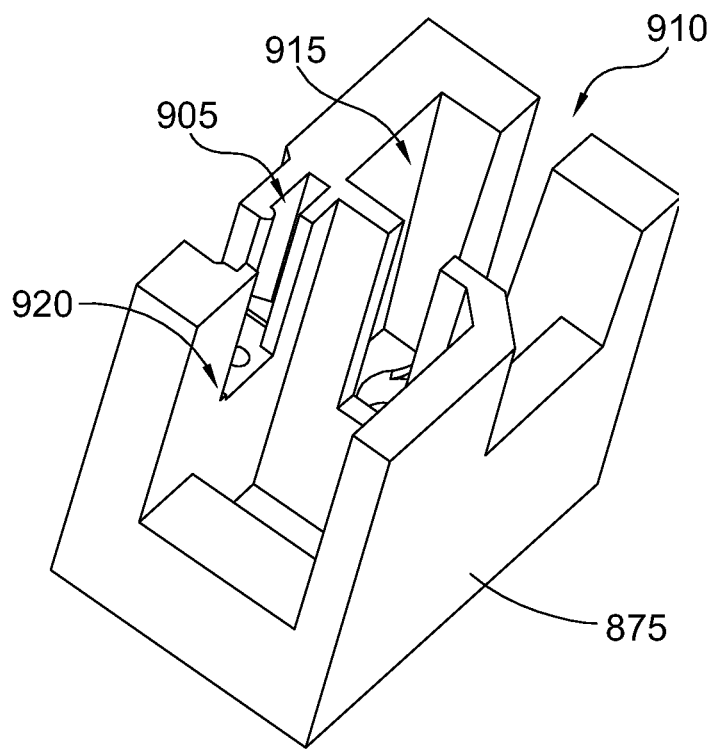
FIG. 9 is a perspective view of a sensor housing in the FIG. 7 coffee grinder control system.
Figure 10:
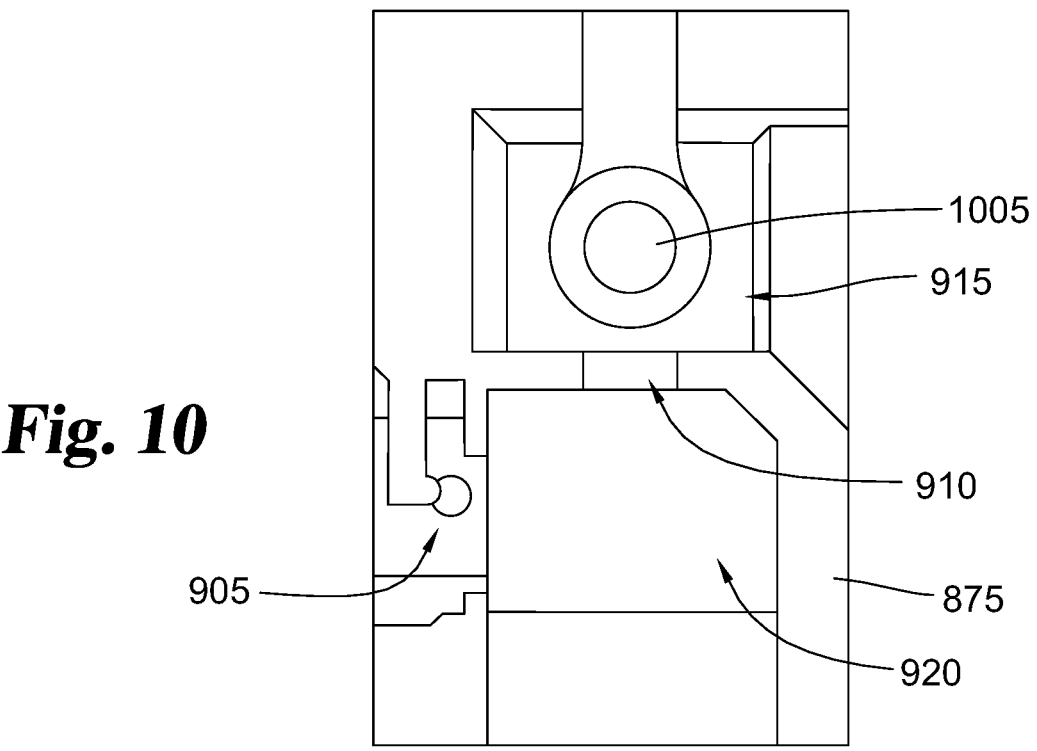
FIG. 10 is a top view of the FIG. 9 sensor housing.

Perspective and top views of one example of the sensor housing 875 are respectively shown in FIGS. 9 and 10. In one form, the sensor housing 875 is made of a non-magnetic material such as plastic. As can be seen, the sensor housing 875 has a sensor slot 905 where the sensor board 715 is secured and a lever arm slot 910 through which the lever arm 850 extends. The sensor housing 875 also defines a guide protrusion cavity 915 where the guide protrusion 835 is secured and a holder cavity 920 where the magnet holder 885 is slidably disposed. Looking at FIG. 10, the sensor housing 875 at the guide protrusion cavity 915 defines a bolt hole 1005 through which a nut or other fastener extends to be secured with a bolt or other securing structure.

Figure 11:
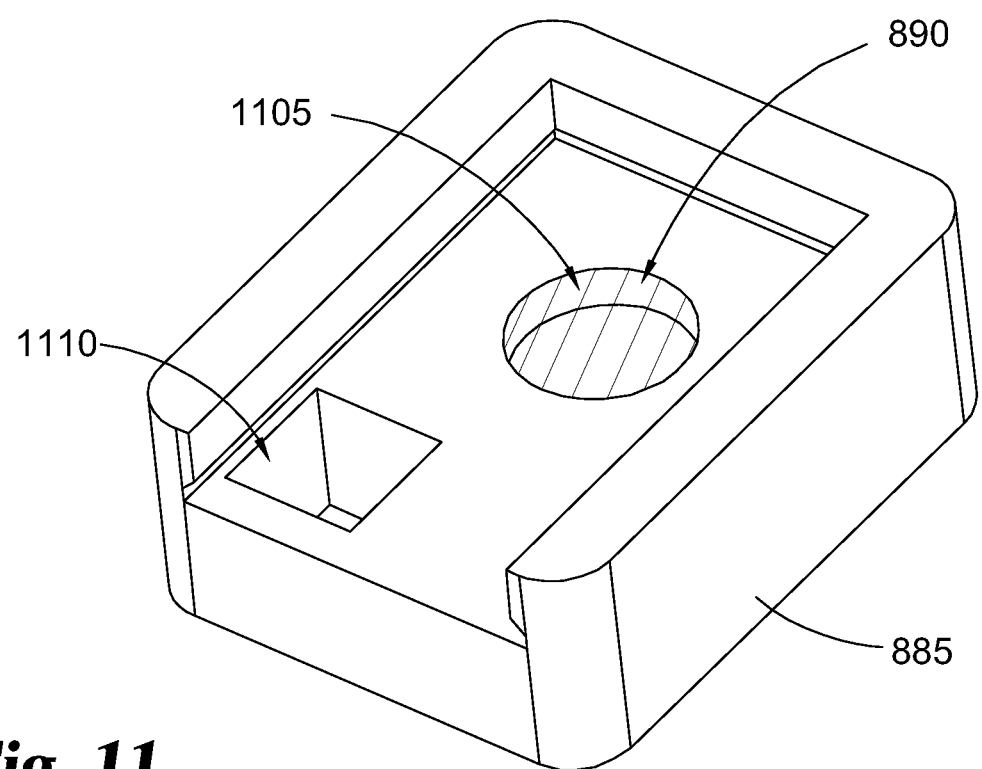
FIG. 11 is a perspective view of a magnet holder in the FIG. 7 coffee grinder control system.

FIG. 11 shows a perspective view of the magnet holder 885. In one form, the magnet holder 885 is made of a non-magnetic material such as plastic. The magnet holder 885 defines a magnet 890 where the magnet cavity 1105 is secured. The magnet holder 885 further has a notch 1110 where the magnet holder 885 is clipped or otherwise secured to the lever arm 850. It should be recognized that the magnet holder 885 can be secured to the lever arm 850 in other ways such as via an adhesive or fastener. The configuration of the sensor housing 875 and magnet holder 885 as well as the other components of the coffee grinder control system 700 can be easily retrofitted as an aftermarket product to coffee grinders from Original Equipment Manufacturers (OEMs).

As noted before, the coffee grinder control system 700 generally operates in a similar fashion as the previously described examples. Referring to FIGS. 6, 7, and 8, the user via the I/O device 722 enters one or more variables (e.g., bean type, drink style, etc.) and/or a code into the coffee grinder control system 700 in stage 602. Based on the input from the I/O device 722 and other information, such as from the server 408 (FIG. 4), the processor 725 of the controller 705 calculates the grind settings, such as the burr gap, motor speed, and grind time, for the coffee grinder 710. Through the I/O device 722, the controller 705 displays or otherwise provides the burr gap value to user.

In stage 604, the user rotates the knob 840 to adjust the burr gap 528 between the upper grinding element 502 and lower grinding element 504. During this adjustment, the adjustment rod 845 extends or retracts in the longitudinal axis 865 which in turn causes the lever arm 850 to pivot about the fulcrum bracket 830 of the grinder housing 815. The motor support 870, which contacts the lever arm 850, in turn moves. As noted before, the lower grinding element 504 is secured to the motor 820 (or motor 506 in FIG. 5) such that the lower grinding element 504 moves as the motor 820 is moved by the lever arm 850. The upper grinding element 502 remains stationary as the lower grinding element 504 moves such that the burr gap 528 is changed. At the same time, the controller 705 monitors the burr gap 528 through the sensor board 715. With the magnet holder 885 secured to the lever arm 850, the sensor board 715 is able to detect the relative position of the lever arm 850 which can be used to infer the burr gap 528. The controller 705 can then display or otherwise provide the current burr gap reading (or corresponding code indicator) to the user so that the user can make sure that the burr gap is properly set. In another version, the I/O device 722 can provide a simplified output such as an indicator light (e.g., green light) or sound to indicate when the proper burr gap is set and/or accompanying instructions for setting the burr gap (e.g., "turn knob clockwise"). As noted for other examples, the controller 705 can automatically set and confirm the burr gap through the sensor board 715 without user action.

Once the burr gap or other parameters are set, the user can manually via the I/O device 722 or the coffee grinder control system 700 automatically initiate grinding of the coffee by the coffee grinder 710 in stage 606. In one variation, the controller 705 includes an interlock feature that inhibits starting of grinding until the calculated burr gap is properly set. During grinding, the controller 705 can monitor and control operation of the motor 820 through the grinder power board 720. For instance, the grind speed can be reduced so as to lower the temperature inside the coffee grinder 710. With the clock 735, the controller 705 can control the grind time and/or provide a countdown timer to the user with the I/O device 722. Once the grind time is achieved, the controller 705 can turn off the motor 820 or the user can manually stop the motor 820 such as by pushing a stop button or by taking some other action via the I/O device 722.

A technique for determining the grind settings for the previously discussed systems will now be described. As noted before, a number of variables are considered when determining the grind setting. For example, some of these factors impacting the grind setting include coffee type (i.e., a specific product from a roaster), shot type (expressed as a particular target ratio and time), dry coffee dose, coffee age (in days, calculated from a user-input roast date), portafilter basket diameter, and temperature as well as a user-specified offset, if so desired. Based on these factors, a grind setting, which for example can be expressed in microns of burr gap, can be provided for the particular coffee. In one form, these calculations be performed remotely by the server 408 and/or locally by the coffee grinder control system 400 (FIG. 4).

The general equation for determining the grind setting or burr gap is represented by Equation 1 below.

Equation 1

$$G = \sum_{i=1}^{n} W_i \times P_i$$

where:
G=Grinder Burr Gap Setting;
P=Parameter;
W=Coefficient for Parameter;
i=Parameter Number; and
n=Number of Parameters.

Parameters (P) are variables designated by the user and/or automatically determined by the coffee grinder control system 400 (and/or the server 408). The coefficients (W) are generally conversion factors that convert the parameters into units of the grinder burr gap settings (G). The grinder burr gap setting (G) corresponds to the desired burr gap 528 in the coffee grinder 710. In one example, the grinder burr gap settings are measured in terms of microns, but other measurement units can be used.

One specific form or example applying this equation is provided below in Equation 2.

$$G = P_{Offset} + W_{Bias} + (W_{58Basket} \times P_{58Basket}) + (W_{Capp} \times P_{Capp}) + (W_{Latte} \times P_{Latte}) + (W_{DoR} \times P_{DoR}) + (W_{Dose} \times P_{Dose}) + (W_{Temp} \times P_{Temp})$$

Equation 2 where:

$P_{offset}$=User defined offset;

$W_{Bias}$=Grind burr setting gap if all parameters were zero (0);

$P_{58Basket}$=Boolean that is equal to 1 when a 58 mm basket is used and 0 when the 58 mm basket is not used $W_{58Basket}$=Offset in the grind burr setting when a 58 mm basket is used, rather than a default 53 mm basket;

$P_{Capp}$=Boolean that is equal to 1 when a cappuccino shot is desired and 0 when a cappuccino shot is not used;

$W_{Capp}$=Offset in the grind burr setting when a cappuccino shot is used, rather than a default straight shot;

$P_{Latte}$=Boolean that is equal to 1 when a latte shot is desired and 0 when a latte shot is not used;

$W_{Latte}$=Offset in the grind burr setting when a latte shot is used, rather than the default straight shot;

$P_{DoR}$=Age of coffee from roasting in days;

$W_{DoR}$=Offset in the grind setting for every additional day from a roast date;

$P_{Dose}$=Mass or weight of a dry coffee shot in grams;

$W_{Dose}$=Change in grind setting for every additional gram of dry coffee dose;

$P_{Temp}$=Temperature of the coffee shot in degrees Celsius; and $W_{Temp}$=Change in grind setting for every additional degree in temperature change.

Once more, the coefficients (W) are generally conversion factors, which convert the value of a particular parameter (P) into units of burr gap 528 (e.g., into microns). For example, WDoR=−0.25 can be interpreted that for each after roasting the coffee, the grinder burr gap setting is reduced 0.25 microns. The POffset is a user-defined offset that shifts the output of the equation up or down by the amount the user wishes or automatically based on other data such as taste preferences and/or historical data. In this example, the coefficient for the offset is one (i.e., WOffset=1), but the WOffset can have other values in further examples. For instance, the user preference can be discounted by half with a WOffset=0.5. The WBias coefficient represents the y-intercept. The WBias is what the grinder burr gap setting would be if all parameters were equal to 0 which is usually never the case.

The default condition for Equation 2 in this example is that the espresso machine has a filter basket with a 53 mm diameter and the coffee drink requires a straight espresso shot. When a larger sized, 58 mm diameter basket is used in the particular espresso machine, the P58Basket parameter is set to one (1), and the burr gap setting is adjusted by the coefficient for the 58 mm basket (W58Basket). On the other hand, when a basket with a 53 mm diameter is used, the P58Basket parameter is set to zero (0). The PCapp and PLatte parameters are used to set the grinder burr set gap setting depending on the type of coffee drink required. For instance, when a standard espresso is requested, then both of these parameters are set to zero (i.e., PCapp=0 and PLatte=0). When a latte is desired, the PCapp is set to 0 (i.e., PCapp=0), and the PLatte is set to one (i.e., Platte=1). As a result, the grinder burr gap is offset by the WLatte coefficient. The PCapp is set to one (i.e., PCapp=1), and the PLatte is set to zero (i.e., Platte=0) when a cappuccino is the desired beverage. It should be recognized that at most only one of these parameters (i.e., PCapp and PLatte) can be set to one (1) at the same time. In other words, PCapp and PLatte cannot be both set to one (1) at the same time.

It was discovered that the age of the coffee beans from roasting also impacted the grinder burr gap setting. Equation 2 accounts for this with the PDoR parameter and the WDoR coefficient. The grinder burr gap setting is offset by the WDoR coefficient for every day after the coffee beans have been roasted. It was also found that the mass (or weight) of the coffee shot impacted the desired grinder burr gap. This is accounted for by the PDose parameter and the WDose coefficient which adjust the grinder burr setting based on the mass of the coffee shot. With the PTemp parameter and the WTemp coefficient, the grinder burr gap setting can be adjusted based on the temperature of the coffee beans in the grinder.

The parameters can be manually entered via the I/O device 722 by the user in certain examples. Some or all of these parameters can be determined by the controller 705 in other examples. In other variations, a combination approach is used in which the user manually enters some of the parameters and the controller 705 senses or otherwise determines the remaining parameters and/or confirms those that were manually entered. For instance, the coffee grinder control system 700 in FIG. 7 can include sensors that determine when a 58 mm basket is used and the temperature of the coffee beans being ground.

The parameters can be updated and changed during the grinding process so as to readjust the grinder burr gap setting. For instance, temperature changes can be accounted for during the grinding process. It should be recognized that not all of these parameters in Equation 2 need to be used and/or additional parameters as well as coefficients can be used in other variations. For instance, the temperature factor for adjusting the grinder burr gap setting can be eliminated in certain situations. In another example, Equation 2 can incorporate speed of the grinder motor and/or grinding time that is monitored by the controller 705 via the grinder power board 720.

Any particular coffee type has a unique set of values for each of these coefficients. In one form, these coefficients are determined experimentally, and in other forms, some of these coefficients can be determined anecdotally or based on experience. To determine the coefficients experimentally, a Multiple Linear Regression (MLR) statistical technique is used in one example. It should be recognized that other statistical modeling techniques can be used such as nonlinear regression, stepwise regression, polynomial regression, ridge regression, and/or Least Absolute Shrinkage and Selection Operator (LASSO) techniques.

In one example, MLR can be used on a data set that includes espresso shots made to encompass all reasonably expected values for each of the parameters. In one form, an optimized data set is used that allows each variable to be examined individually, for easier analysis, and which requires fewer data points to yield valid results. In another form, MLR over a non-optimized data set is used to obtain the coefficients. In this non-optimized data set approach, more data points are typically required in order to make sure that the data set encompassed all scenarios in terms of shot type, dose, days off roast, etc. which could be reasonably expected and to minimize any cross-talk, or noise between variables.

In one particular example, the MLR technique is used with an optimized data set. An initial baseline condition is set with the normal days off roast (PDoR) of 1 day, a weight (PDose) of 18 grams, a 53 mm basket being used, and a straight shot being provided for a particular baseline coffee bean (e.g., type/brand). In this particular example, the temperature is not considered a part of the model, but in other forms, a baseline temperature can also be set. Using this baseline, the coffee is ground by the coffee grinder 710 for a set, baseline time period (e.g., 20 seconds). A statistically significant sample for the grind size of the coffee ground by the coffee grinder 710 under these baseline conditions is then measured and determined. For example, the average grind size of the coffee can be used for MLR, but other measures can be used such as the median grind size or maximum grind size. This average grind size or other measure is then used as a proxy for the grinder burr gap size (G) for determining the coefficients. In one example, these baseline and other test conditions are repeated at least two times. During these tests, the time, output weight, and grind setting data can also be recorded. Other objective indicia can also be recorded along with subjective indicia such as taste of the brewed espresso.

In subsequent tests, only one of these variables is changed at a time. For example, the days off roast, weight, and basket size remain as the same baseline values, and the shot type is changed from a standard shot to a latte shot. This single variable test is performed at least two times. The other variables are varied from the baseline conditions and tested in a similar fashion one at a time. In other words, only one variable is varied from baseline conditions in each variable test. For instance, the baseline days off roast (e.g., 1 day), weight (e.g., 20 grams), and the shot type (e.g., standard shot) are set to the baseline values, and a basket size with a 58 mm diameter is used. Varying the basket size helps to verify that shot type and basket type are independent. If the shot type and basket type are found to be interdependent, then the model requires second order linear regression to properly scale the effect of shot type for each basket size. To calculate the bias coefficient (WBias), the slopes of the days off roast (WDoR) and dose weight (WDose) are used in a point slope formula to determine the intercept.

After these coefficients are determined, the coefficients and/or resulting equation can be stored on the server 408 (FIG. 4) and/or in the memory 730 of the controller 705 (FIG. 7). The controller 705 can for instance receive updates to these coefficients over the network 404 on an as needed basis and/or through push notifications. In one use case example, the user indicates whether a larger 58 mm basket (or other sized basket) is being used, the type of shot (i.e., espresso, cappuccino, latte, etc.), the days off roasting (DoR) for the coffee beans, and the weight of the dry coffee beans (Dose) for the shot along with any desired offset (POffset). The user can further indicate the coffee bean variety and/or brand which can also be used as a parameter. Some or all of this parameter data can be automatically entered by the controller 705. For instance, the controller 705 can scan a barcode or RFID tag on the coffee packaging to determine the days from roasting as well as the coffee type. The processor 725 of the controller 705 can determine the weight of the coffee beans automatically through a scale that is operatively coupled to the controller 705, and the controller 705 can determine the basket size through a sensor, barcode reader, and/or vision system located on the grinder.

Based on the parameters, the processor 725 of the controller 705 locally determines the grinder burr gap setting in one variation, and in another variation, the controller 705 sends the raw parameter information to the server 408 (FIG. 4) that calculates and returns the burr gap setting to the controller 705. As explained before, the controller 705 through the I/O device 722 provides to the user the burr gap setting or a code/symbol (e.g., a letter) indicative of the burr gap setting. The user then turns the knob 840 to the provided burr gap setting. Once more, the controller 705 in other variations can automatically set and control the burr gap setting before and during grinding. The user can then initiate the grinding with the grind settings through the I/O device 722 or the controller 705 can automatically initiate the grinding process. Once the appropriate grind time is reached, the user can manually stop the grinding and/or the controller 705 via the clock 735 can automatically stop the grinding at the appropriate time via the grinder power board 720. With this technique, a consistent, high quality coffee drink can be achieved.

In accordance with certain inventive variants the present disclosure provides a coffee grinder control system which greatly facilitates a user's ability to position the grinding elements of an associated coffee grinder. In certain embodiments, the position of the grinding elements may be manually adjusted by the user, for example by operation of a rotating knob. In some forms such manual adjustments may be detected by the sensor. In certain embodiments, the sensor functions to encode the rotational movement of the adjustment rod to a signal which is transmitted to a control unit and/or a display. In some forms the sensor is configured to determine the relative position of the grinding elements.

In certain embodiments the sensor is operatively connected to a position indicator which is configured to display the relative position of the grinding elements to the user. In some forms the position indicator is indexed for desired grind characteristics and/or coffee brew styles (e.g. Turkish, espresso, mocha, drip, and/or French press).

In some forms the coffee grinder of the present disclosure includes a motor. In certain embodiments the motor is operably connected to the sensor gear so as to drive the sensor gear. The motor may be any suitable motor known to one skilled in the art. In certain embodiments the motor is a stepper motor. In accordance with some forms the motor resistance provides tactile feedback for adjustment of the grinding elements.

In certain embodiments the coffee grinder of the present invention includes a control unit. The control unit is configured to allow users to easily select a desired grind profile. In some forms the control unit activates the motor connected to the sensor gear so as to increase the resistance of the motor and/or drive the sensor gear. In some forms the control unit is operably connected to the grinder, such that adjust of the position of the grinding elements is controlled by the control unit.

In certain embodiments the coffee grinder of the present disclosure is configured to optimize the position of the grinding elements so as to produce a desired grind profile. In some forms the user inputs one or more variables. In accordance with certain embodiments the control unit is configured to scan product packaging or another input. In some forms the control unit is configured to optimize the position of the grinding elements for various types of coffee based on one or more of the following characteristics of the coffee: type, agtron score, brand, origin, botanical variety, roast profile, age, moisture content, water activity, processing method, and/or weight. In some forms, the control unit is configured to optimize the position of the grinding elements based on one or more of the following factors: age of the grinding elements, type of grinding elements, burr style, and/or burr age. In some forms, the control unit is configured to optimize the position of the grinding elements based on one or more of the following environmental factors: ambient temperature, altitude, humidity, water quality, water dissolved solids, water hardness, and/or water alkalinity. In certain forms, the grinding elements are positioned to produce a coffee grind for use in a selected coffee brewer. For example in some forms the control unit is configured to optimize the position of the grinding elements based on one or more of the following characteristics of the selected coffee brewer: type, boiler temperature, brew water temperature, pressure(s), flow rate, and/or control parameter status. In some forms the control unit is configured to optimize the position of the grinding elements based on one or more of the following characteristics of the desired liquid coffee brew: volume, weight, brew time, dissolved solids, coffee extraction percentage, and quality.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Burr Gap" generally refers to a space or height of the space between two grinding elements in a grinder. In one example, the burr gap is the smallest height of the space between two opposing grinder burrs where the ground substance, such as coffee, passes through when ground. The burr gap is generally representative to the resulting grind size of the substance being ground by the grinder.

"Cavity" generally refers to an empty space in a solid object. The cavity can be completely or partially surrounded by the solid object. For example, the cavity can be open to the surrounding environment.

"Coffee Grinder" or "Grinder" generally refers to a device configured to grind or crush coffee beans. The coffee grinder used in accordance with the present invention can be any suitable coffee grinder, for example a blade grinder, a burr grinder, and/or a disc or conical grinder. Blade grinders utilize rotating blades as grinding elements and may be adjusted for example, to alter the speed of the blades and/or the time grinding time. Burr, disc, and conical grinders each include two grinding elements and can be adjusted to alter the distance between the grinding elements. The resulting grind becomes larger and coarser when the relative distance between the grinding elements is increased. The resulting grind becomes finer when the relative distance between the grinding elements is decreased.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible. Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Couple" or "Coupled" generally refers to an indirect and/or direct connection between the identified elements, components, and/or objects. Often the manner of the coupling will be related specifically to the manner in which the two coupled elements interact.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Grind Size" or "Grind Coarseness" generally refers to the widest diameter of individual grains. For ground coffee, the grind size can be generally classified based on the desired grind type, as is shown in Table 2 below (e.g., +/−10% of the measurements shown).

TABLE 2

| DESCRIPTION | SIZE (mm) | # OF PARTICLES | INCREASE IN PARTS/gm | RATIO INCREASE | AREA (sq./gm) |
|---|---|---|---|---|---|
| Whole Bean | 6.0 | 6 | — | — | 8 |
| Cracked Bean | 3.0 | 48 | 42 | 1 | 16 |
| Coarse Grind | 1.5 | 384 | 336 | 8 | 32 |
| Regular Grind | 1.0 | 1,296 | 912 | 22 | 48 |
| Drip Grind | 0.75 | 3,072 | 1,776 | 42 | 64 |
| Fine Grind | 0.38 | 24,572 | 21,500 | 512 | 128 |
| Espresso Grind | 0.20 | 491,440 | 466,868 | 11,115 | 240 |

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Input Device" generally refers to any device coupled to a computer that is configured to receive input and deliver the input to a processor, memory, or other part of the computer. Such input devices can include keyboards, mice, trackballs, and touch sensitive pointing devices such as touchpads or touchscreens. Input devices also include any sensor or sensor array for detecting environmental conditions such as temperature, light, noise, vibration, humidity, and the like.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Longitudinal" generally refers to the length or lengthwise dimension of an object, rather than across.

"Magnet" generally refers to a material or object that produces a magnetic field external to itself. Types of magnets include permanent magnets and electromagnets. By way of non-limiting examples, magnets in certain circumstances are able to attract (or repel) objects such as those made of iron or steel.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including Static Random Access Memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change RAM (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other nonvolatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Original Equipment Manufacturer" or "OEM" generally refers to an organization that makes finished devices from component parts bought from other organizations that are usually sold under their own brand in a consumer or commercial market.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, California.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems. In other examples, the sensor includes an encoder configured to detect and encode rotational movement. The sensor may be a conductive encoder, an optical encoder, an on-axis magnetic encoder, and/or an off-axis magnetic encoder. In some forms, the sensor can be configured to convert the rotation of the encoder gear to an output signal. The output signal can be digital or analog. The output signal of the sensor indicates the position of the encoder gear.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Server" generally refers to a computer or group of computers that provide(s) data to other computers. It may serve data to systems on a local area network (LAN) or a wide area network (WAN) over the Internet.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | coffee grinder control system |
| 101 | adjustment mechanism |
| 102 | upper adjustment rod |
| 104 | adjustment knob |
| 106 | drive gear |
| 108 | spindle |
| 110 | sensor gear |
| 114 | sensor |
| 116 | sensor spindle |
| 118 | sensor lines |
| 120 | threaded portion |
| 122 | coupler |
| 124 | lower adjustment rod |
| 126 | first longitudinal axis |
| 134 | threaded opening |
| 135 | adjustment rod assembly |
| 200 | coffee grinder control system |
| 201 | adjustment mechanism |
| 202 | upper adjustment rod |
| 204 | coffee grinder |
| 206 | drive gear |
| 208 | spindle |
| 210 | sensor gear |
| 212 | motor |
| 214 | sensor |
| 216 | sensor spindle |
| 218 | sensor lines |
| 220 | threaded portion |
| 222 | coupler |
| 224 | lower adjustment rod |
| 226 | longitudinal axis |
| 228 | control unit |
| 230 | I/O device |
| 232 | grinder communication lines |
| 234 | threaded opening |
| 235 | adjustment rod assembly |
| 236 | linkage |
| 300 | grinder system |
| 301 | adjustment mechanism |
| 302 | upper adjustment rod |
| 304 | knob |
| 308 | spindle |
| 320 | threaded portion |
| 322 | coupler |
| 324 | lower control rod |
| 334 | threaded opening |
| 335 | adjustment rod assembly |
| 336 | linkage |
| 340 | grinder |
| 342 | lower grinding element |
| 344 | upper grinding element |
| 346 | motor |
| 350 | distance |
| 352 | second grinding surface |
| 354 | first grinding surface |
| 400 | coffee grinder control system |
| 402 | grinder network connection |
| 404 | network |
| 406 | server network connection |
| 408 | server |
| 500 | coffee grinder |
| 502 | upper grinding element |
| 504 | lower grinding element |
| 506 | motor |
| 508 | central axis |

-continued

| Reference Numbers | |
|---|---|
| 510 | first grinding surface |
| 512 | second grinding surface |
| 514 | first opening |
| 516 | inner edge |
| 518 | grinding path |
| 520 | second opening |
| 522 | upper grinding element lateral edge |
| 524 | lower grinding element lateral edge |
| 526 | point |
| 528 | burr gap |
| 600 | flowchart |
| 602 | stage |
| 604 | stage |
| 606 | stage |
| 700 | coffee grinder control system |
| 705 | controller |
| 710 | coffee grinder |
| 715 | sensor board |
| 720 | grinder power board |
| 722 | I/O device |
| 725 | processor |
| 730 | memory |
| 735 | clock |
| 740 | motor control relay |
| 805 | motor system |
| 810 | adjustment mechanism |
| 815 | grinder housing |
| 820 | motor |
| 825 | adjustment bracket |
| 830 | fulcrum bracket |
| 835 | guide protrusion |
| 840 | knob |
| 845 | adjustment rod |
| 850 | lever arm |
| 855 | threading |
| 860 | arrow |
| 865 | longitudinal axis |
| 870 | motor support |
| 875 | sensor housing |
| 880 | sensor harness |
| 885 | magnet holder |
| 890 | magnet |
| 905 | sensor slot |
| 910 | lever arm slot |
| 915 | guide protrusion cavity |
| 920 | holder cavity |
| 1005 | bolt hole |
| 1105 | magnet cavity |
| 1110 | notch |

What is claimed is:

1. A system, comprising:
a grinder including
at least two grinding elements that define a burr gap,
an adjustment mechanism configured to adjust the burr gap between the grinding elements,
a controller configured to determine a burr gap setting to set the burr gap, wherein the controller is configured to determine the burr gap setting (G) based on one or more parameters (P) and coefficients (W),
wherein the controller is configured to determine the burr gap setting (G) based on the following equation:

$$G = \sum_{i=1}^{n} W_i \times P_i$$

where:
G=Grinder Burr Gap Setting;
P=Parameter;
W=Coefficient for Parameter;

i=Parameter Number; and
n=Number of Parameters; and
wherein the controller is configured to determine the burr gap setting (G) based on the following equation:

$$G = P_{Offset} + W_{Bias} + (W_{58Basket} \times P_{58Basket}) + (W_{Capp} \times P_{Capp}) + (W_{Latte} \times P_{Latte}) + (W_{DoR} \times P_{DoR}) + (W_{Dose} \times P_{Dose}) + (W_{Temp} \times P_{Temp})$$

where
POffset=User defined offset;
WBias=Grind burr setting gap if all parameters were zero (0);
P58Basket=Boolean that is equal to 1 when a 58 mm basket is used and 0 when a 58 mm basket is not used
W58Basket=Offset in the grind burr setting when a 58 mm basket is used, rather than the default 53 mm basket;
PCapp=Boolean that is equal to 1 when a cappuccino shot is desired and 0 when a cappuccino shot is not used;
WCapp=Offset in the grind burr setting when a cappuccino shot is used, rather than the default straight shot;
PLatte=Boolean that is equal to 1 when a latte shot is desired and 0 when a latte shot is not used;
WLatte=Offset in the grind burr setting when a latte shot is used, rather than the default straight shot;
PDoR=Age of coffee from roasting in days;
WDoR=Offset in the grind setting for every additional day from the roast date;
PDose=Mass or weight of the dry coffee shot in grams;
WDose=Change in grind setting for every additional gram of dry coffee dose;
PTemp=Temperature of the coffee shot in degrees Celsius; and
WTemp=Change in grind setting for every additional degree in temperature change.

2. The system of claim 1, wherein the grinding elements include a first grinding element and a second grinding element that define the burr gap.

3. The system of claim 2, wherein the first grinding element is fixed and the second grinding element is movable relative to the first grinding element.

4. The system of claim 3, wherein the first grinding element includes a first burr and the second grinding element includes a second burr.

5. The system of claim 4, wherein the grinder includes a grinder motor connected to the second burr to rotate the second burr.

6. The system of claim 5, wherein the adjustment mechanism includes a linkage configured to move the grinder motor to adjust the burr gap.

7. The system of claim 1, wherein the one or more parameters (P) include basket size.

8. The system of claim 1, wherein the one or more parameters (P) include coffee shot type.

9. The system of claim 1, wherein the one or more parameters (P) include age of coffee from roasting.

10. The system of claim 1, wherein the one or more parameters (P) include dry coffee shot dose mass.

11. The system of claim 1, wherein the one or more parameters (P) include coffee temperature.

12. The system of claim 1, wherein the grinder includes an input device operatively connected to the controller to receive at least one of the one or more parameters (P) from the user.

13. The system of claim 1, further comprising:
a server operatively connected to the controller over a network to provide at least one of the coefficients (W).

14. The system of claim 13, wherein the server is configured to determine the coefficients (W) based on experimental data.

15. The system of claim 14, wherein the server is configured to determine the coefficients (W) using a statistical modeling technique.

16. The system of claim 15, wherein the statistical modelling technique includes a Multiple Linear Regression (MLR) technique.

17. The system of claim 1, wherein the grinder includes an output device operatively connected to the controller to provide the burr gap setting (G) to the user.

18. The system of claim 17, wherein the output device is incorporated in an Input/Output (I/O) device.

19. The system of claim 1, further comprising:
one or more sensors operatively coupled to the controller;
wherein the sensors are configured to sense the burr gap; and
a server operatively coupled to the controller to supply data to determine the burr gap setting.

20. A system, comprising:
a grinder including
at least two grinding elements that define a burr gap, wherein the grinding elements include a first grinding element and a second grinding element that define the burr gap, wherein the first grinding element is fixed and the second grinding element is movable relative to the first grinding element, wherein the first grinding element includes a first burr and the second grinding element includes a second burr,
a grinder motor connected to the second burr to rotate the second burr,
an adjustment mechanism configured to adjust the burr gap between the grinding elements,
wherein the adjustment mechanism includes a linkage configured to move the grinder motor to adjust the burr gap, and
wherein the linkage includes a lever arm configured to move the grinder motor and an adjustment rod assembly coupled to the lever arm.

21. The system of claim 20, wherein the adjustment rod assembly is coupled to the lever arm to move the lever arm by extending and retracting.

22. The system of claim 21, wherein the adjustment rod assembly includes a first adjustment rod and a second adjustment rod threadedly engaged to the first adjustment rod.

23. The system of claim 21, wherein the adjustment mechanism includes a knob coupled to the adjustment rod assembly to adjust the burr gap.

24. The system of claim 21, wherein the adjustment mechanism includes an adjustment motor coupled to the adjustment rod assembly to automatically adjust the burr gap.

25. The system of claim 20, wherein the adjustment mechanism includes a sensor configured to sense the burr gap.

26. The system of claim 25, wherein the sensor includes a sensor gear coupled to the adjustment rod assembly.

27. The system of claim 25, wherein the sensor includes a magnet coupled to the lever arm and a sensor board positioned to sense movement of the magnet.

28. A method, comprising:
determining a burr gap setting with a controller of a grinder, wherein said determining includes calculating the burr gap setting (G) based on one or more parameters (P) and coefficients (W);

adjusting a burr gap between one or more grinding elements in the grinder to the burr gap setting with an adjustment mechanism of the grinder; and wherein controller is configured to determine the burr gap setting (G) based on the following equation:

$$P_{Offset} + W_{Bias} + (W_{58Basket} \times P_{58Basket}) + (W_{Capp} \times P_{Capp}) + (W_{Latte} \times P_{Latte}) + (W_{DoR} \times P_{DoR}) + (W_{Dose} \times P_{Dose}) + (W_{Temp} \times P_{Temp})$$

where

POffset=User defined offset;

WBias=Grind burr setting gap if all parameters were zero (0);

P58Basket=Boolean that is equal to 1 when a 58 mm basket is used and 0 when a 58 mm basket is not used W58Basket=Offset in the grind burr setting when a 58 mm basket is used, rather than the default 53 mm basket;

PCapp=Boolean that is equal to 1 when a cappuccino shot is desired and 0 when a cappuccino shot is not used;

WCapp=Offset in the grind burr setting when a cappuccino shot is used, rather than the default straight shot;

PLatte=Boolean that is equal to 1 when a latte shot is desired and 0 when a latte shot is not used;

WLatte=Offset in the grind burr setting when a latte shot is used, rather than the default straight shot;

PDoR=Age of coffee from roasting in days;

WDoR=Offset in the grind setting for every additional day from the roast date;

PDose=Mass or weight of the dry coffee shot in grams;

WDose=Change in grind setting for every additional gram of dry coffee dose;

PTemp=Temperature of the coffee shot in degrees Celsius; and

WTemp=Change in grind setting for every additional degree in temperature change.

29. The method of claim 28, wherein the one or more parameters (P) include basket size.

30. The method of claim 28, wherein the one or more parameters (P) include coffee shot type.

31. The method of claim 28, wherein the one or more parameters (P) include age of coffee from roasting.

32. The method of claim 28, wherein the one or more parameters (P) include dry coffee shot dose mass.

33. The method of claim 28, wherein the one or more parameters (P) include coffee temperature.

34. The method of claim 28, further comprising:

determining the burr gap setting includes receiving data from a server over a network that is used to calculate the burr gap setting; and adjusting the burr gap includes measuring the burr gap with one or more sensors.

* * * * *

UNITED STATES PATENT AND TRADEMARK OFFICE
CERTIFICATE OF CORRECTION

PATENT NO. : 12,082,744 B2
APPLICATION NO. : 17/301551
DATED : September 10, 2024
INVENTOR(S) : Mike Jebb et al.

Page 1 of 1

It is certified that error appears in the above-identified patent and that said Letters Patent is hereby corrected as shown below:

In the Claims

Column 33, Claim 28, Lines 1-2, replace "adjusting a burr gap between one or more grinding" with --adjusting a burr gap between at least two grinding--

Signed and Sealed this
Nineteenth Day of November, 2024

Katherine Kelly Vidal
*Director of the United States Patent and Trademark Office*